United States Patent
Yoon

(10) Patent No.: US 12,389,377 B2
(45) Date of Patent: Aug. 12, 2025

(54) PARTIAL SENSING METHOD AND DEVICE FOR DEVICE-TO-DEVICE COMMUNICATION IN WIRELESS COMMUNICATION SYSTEM

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 390 days.

(21) Appl. No.: 18/157,076

(22) Filed: Jan. 20, 2023

(65) Prior Publication Data

US 2023/0156670 A1  May 18, 2023

Related U.S. Application Data

(63) Continuation of application No. PCT/KR2021/007410, filed on Jun. 14, 2021.

(30) Foreign Application Priority Data

Jul. 21, 2020  (KR) ........................ 10-2020-0090273

(51) Int. Cl.
*H04W 72/02* (2009.01)
*H04W 72/0446* (2023.01)
*H04W 72/25* (2023.01)

(52) U.S. Cl.
CPC ....... *H04W 72/02* (2013.01); *H04W 72/0446* (2013.01); *H04W 72/25* (2023.01)

(58) Field of Classification Search
CPC .. H04W 72/02; H04W 72/25; H04W 72/0446
See application file for complete search history.

(56) References Cited

U.S. PATENT DOCUMENTS

2019/0313405 A1  10/2019  Li et al.
2023/0020105 A1*  1/2023  Shin .................... H04W 72/542

FOREIGN PATENT DOCUMENTS

KR  10-2019-0000891 A  1/2019

OTHER PUBLICATIONS

3GPP TS 38.331 VI6.0.0 (Mar. 2020). 3rd Generation Partnership Project; Technical Specification Group Radio Access Network; NR; Radio Resource Control (RRC) protocol specification (Release 16).
(Continued)

*Primary Examiner* — Won Tae C Kim

(57) ABSTRACT

The present disclosure relates to a partial sensing method and apparatus for device-to-device (D2D) communication in a wireless communication system. Disclosed is a method of selecting a resource for D2D communication based on partial sensing in a wireless communication system, the method including receiving a transmission resource reservation period and a reception resource reservation period from a base station through upper layer signaling; determining a selection window; determining a sensing window for partial sensing based on the selection window, based on the transmission resource reservation period; excluding an overlapping resource through sensing in the determined sensing window; and performing transmission by selecting a resource for transmitting control information and data in the selection window based on the excluded resource information. The reception resource reservation period received through upper layer signaling may be set to a limited value based on the transmission resource reservation period.

20 Claims, 22 Drawing Sheets

(56) References Cited

OTHER PUBLICATIONS

International Search Report for International Patent Application No. PCT/KR2021/007410, dated Sep. 10, 2021.
CATT. On mode 2 resource allocation in NR V2X. RI-1906316, 3GPP TSG RAN WGI Meeting #97. Reno, USA. May 4, 2019.
3GPP; TSG RAN; NR; Physical layer procedures for data (Release 16). 3GPP TS 38.214 VI6.2.0 (Jun. 20, 2020). Jul. 20, 2020.
Intel Corporation. Outcome of [I01-e-NR-5G_ V2X_NRSL-Mode-2-04]. RI-2004941, 3GPP TSG RAN WGI Meeting #101-e. Jun. 8, 2020.
VIVO. Discussion on mode 2 resource allocation mechanism. RI-1908150, 3GPP TSG RAN WG I Meeting #98. Prague, CZ. Aug. 17, 2019.
Written Opinion for International Patent Application No. PCT/KR2021/007410, dated Sep. 10, 2021.
3GPP TS 38.331 VI6.0.0 (Mar. 2020). Brd Generation Partnership Project; Technical Specification Group Radio Access Network; NR; Radio Resource Control (RRC) protocol specification (Release 16).
Extended European search report for Application No. 21846944.3 from European Patent Office dated Jul. 18, 2024.
3GPP TSG RAN WG1 Meeting #88; R1-1702141 Athens, Greece Feb. 13-17, 2017 Intel Corporation Remaining details of partial sensing for P2V communication 7.2.1.2.

\* cited by examiner (a) V2V OPERATION (b) V2I OPERATION (c) V2P OPERATION (a) V2V OPERATION (b) V2I OPERATION (c) V2P OPERATION (a)

(b)

(a)

(b)

PARTIAL SENSING METHOD AND DEVICE FOR DEVICE-TO-DEVICE COMMUNICATION IN WIRELESS COMMUNICATION SYSTEM

CROSS-REFERENCE TO RELATED APPLICATIONS

This application is a continuation of International patent application No. PCT/KR2021/007410, filed on Jun. 14, 2021, which claims priority from and the benefit of Korean Patent Application No. 10-2020-0090273, filed on Jul. 21, 2020, each of which is hereby incorporated by reference in its entirety.

BACKGROUND

The present disclosure relates to communication in a wireless communication system, and more particularly, to a partial sensing method and apparatus for device-to-device (D2D) communication.

Device-to-device (D2D) communication represents that a single user equipment (UE) directly communicates with another UE. Direct communication represents that a single UE communicates with another UE under control of a network or without using another network device through determination of the UE itself.

The D2D communication may apply to vehicular communication, which is generally referred to as vehicle-to-everything (V2X) communication. Vehicle-to-everything (V2X) communication may include a communication method of exchanging or sharing road infrastructures during driving and information, such as traffic conditions, through communication with other vehicles. A V2X-based service may include, for example, an autonomous driving service, a vehicular remote control service, an interactive service, such as a game, and large capacity short-range audio/video services, such as augmented reality (AR) and virtual reality (VR). Detailed techniques additionally required for Long Term Evolution (LTE) and new radio (NR) system that are radio access technology (RAT) in a 5G system is under discussion based on performance requirements for supporting various V2X-based services through the 5G system.

A technical object of the present disclosure is to provide a partial sensing method and device for device-to-device (D2D) communication in a wireless communication system.

An additional technical object of the present disclosure is to provide a partial sensing method and device in selecting a resource for sidelink data transmission and reception in a new radio (NR) system.

An additional technical object of the present disclosure is to provide a method and device to set up a sensing window for a partial sensing.

Technical objects achievable from the present disclosure are not limited to the aforementioned technical objects and still other technical objects not described herein may be clearly understood by one of ordinary sill in the art to which the disclosure pertains from the following description.

According to an aspect of the present disclosure, there is provided a partial sensing method and apparatus for device-to-device (D2D) communication in a wireless communication system. A method of selecting a resource for D2D communication based on partial sensing in a wireless communication system according to an embodiment of the present disclosure includes receiving a transmission resource reservation period and a reception resource reservation period from a base station through upper layer signaling; determining a selection window; determining a sensing window for partial sensing based on the selection window, based on the transmission resource reservation period; excluding an overlapping resource through sensing in the determined sensing window; and performing transmission by selecting a resource for transmitting control information and data in the selection window based on information of the excluded resource. Here, the reception resource reservation period received through upper layer signaling may be set to a limited value based on the transmission resource reservation period.

Also, according to an aspect of the present disclosure, there may be provided a method of selecting a resource for D2D communication based on partial sensing in a wireless communication system. Here, a method of selecting a resource includes receiving a transmission resource reservation period ($P_{rsvp\_TX}$) and a reception resource reservation period ($P_{rsvp\_RX}$) through upper layer signaling; determining a selection window; configuring a first sensing window and a second sensing window for partial sensing based on the selection window; excluding an overlapping resource through sensing in the determined sensing window; and performing transmission by selecting a resource for transmitting control information and data in the selection window based on information of the excluded resource. The first sensing window may be a window in which sensing is performed based on full sensing and the second sensing window may be a window in which sensing is performed based on partial sensing.

Features briefly described above in relation to the present disclosure are merely example aspects of the following detailed description and do not limit the scope of the present disclosure.

According to the present disclosure, there may be provided a partial sensing method and device for device-to-device (D2D) communication in a wireless communication system.

According to the present disclosure, there may be provided a partial sensing method and device in selecting a resource for sidelink data transmission and reception in a new radio (NR) system.

According to the present disclosure, there may be provided a method and apparatus for setting a transmission resource reservation period and a reception resource reservation period for partial sensing in an NR system.

According to the present disclosure, there may be provided a method and apparatus for setting a sensing window for partial sensing in an NR system.

Effects achievable from the present disclosure are not limited to the aforementioned effects and still other effects not described herein may be clearly understood by one of ordinary skill in the art to which the present disclosure pertains from the following description.

DETAILED DESCRIPTION

Figure 1:
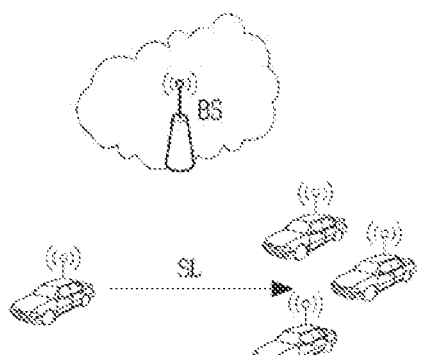
FIG. 1 illustrates examples of a vehicle-to-everything (V2X) scenario to which the present disclosure may apply.
Figure 1:
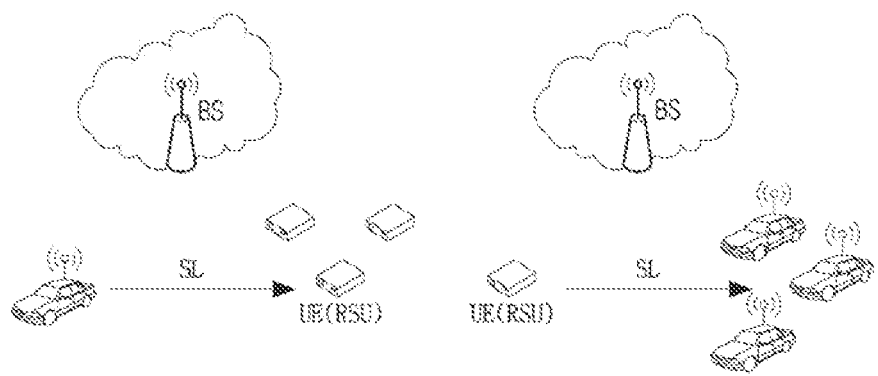
Figure 1:
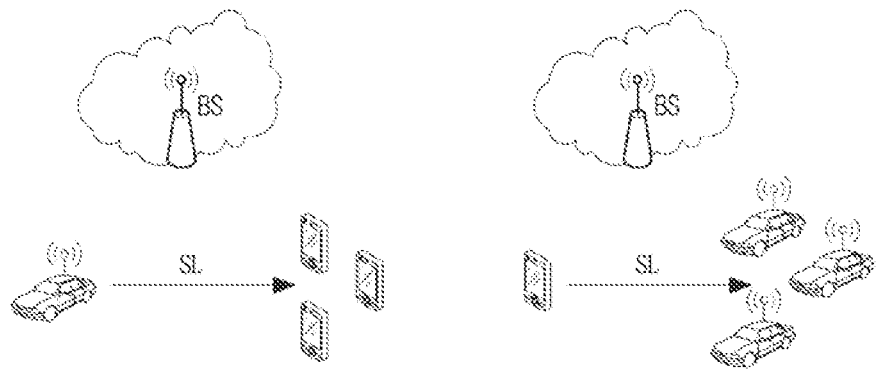

Various examples of the disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

When it is determined that detailed description related to a known configuration or function in describing the examples of the present disclosure, the detailed description is omitted. Also, a part irrelevant to the description of the disclosure is omitted and like reference numerals refer to like elements.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

Herein, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

The description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

The definitions of abbreviations used herein as below.
D2D: Device to Device (communication)
DCI: Downlink Control Information
V2X: Vehicle to X (everything)
V2V: Vehicle to Vehicle
V2P: Vehicle to Pedestrian
V2I/N: Vehicle to Infrastructure/Network
SL: Sidelink
SCI: Sidelink Control Information
SFCI: Sidelink Feedback Control Information
PSSCH: Physical Sidelink Shared Channel
PSBCH: Physical Sidelink Broadcast Channel PSCCH: Physical Sidelink Control Channel
PSDCH: Physical Sidelink Discovery Channel
PSFICH: Physical Sidelink Feedback Indication Channel
ProSe: (Device to Device) Proximity Services
SLSS: Sidelink Synchronization Signal
PSSID: Physical Sidelink Synchronization Identity
$n^{SA}_{ID}$: Sidelink group destination identity
$N^{SL}_{ID}$: Physical sidelink synchronization identity
SA: Scheduling assignment
TB: Transport Block
TTI: Transmission Time Interval
RB: Resource Block In the following description, although the term "new radio (NR) system" is used to distinguish a system according to various examples of the present disclosure from the existing system, the scope of the present disclosure is not limited thereto.

For example, a new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC). Here, the term "NR system" used herein is used as an example of a wireless communication system, and the term "NR system" itself is not limited to the aforementioned features.

Also, for example, 5-th generation (5G) mobile communication technology may be defined. Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system.

For example, a sidelink field of 5G may include all of sidelink technology in an LTE system and sidelink technology in an NR system. Here, the sidelink field may be essential to enhance a performance and to integrate new and various services through an ultra high reliability and an ultra low latency.

In the following, for clarity of description, an operation for vehicle-to-everything (V2X) communication and related information will be described based on the NR system. Here, the following features may not be limited to a specific system and may apply alike to other systems that are similarly configured. However, it is provided as an example only and the present disclosure is not limited thereto.

Meanwhile, V2X communication may be communication based on a vehicle. Here, the concept of a vehicle is evolving from a simple transportation device to a new platform. For example, information technology (IT) applies to a vehicle and various V2X services are provided accordingly. Services, such as, for example, prevention of traffic accidents, improvement of traffic environments, automatic driving, and remote driving, are provided. To this end, there is a growing need for developing and applying sidelink related technology.

In detail, with respect to existing communication technology, a communication from an Base Station (BS) to a user equipment (UE) may be a downlink and a communication from the UE to the BS may be an uplink. Here, communication between UEs may be required in addition to the communication between the BS and the UE. Here, the communication from one UE to another UE may be the aforementioned sidelink. For example, with respect to the aforementioned V2X communication, a vehicle-to-vehicle (V2V) communication or communication between a vehicle and another object (e.g., an object, excluding the BS, such as a pedestrian UE, a UE-type roadside unit (RSU), and the like) may be a sidelink. That is, in the case of performing vehicle-based communication, there are some constraints using only communication with the eNodeB alone. Therefore, the aforementioned sidelink technology may be developed and applied.

Figure 2:
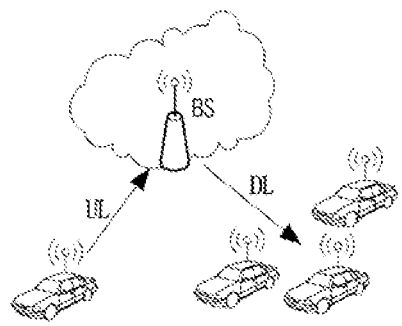
FIG. 2 illustrates examples of a vehicle-to-everything (V2X) scenario to which the present disclosure may apply.
Figure 2:
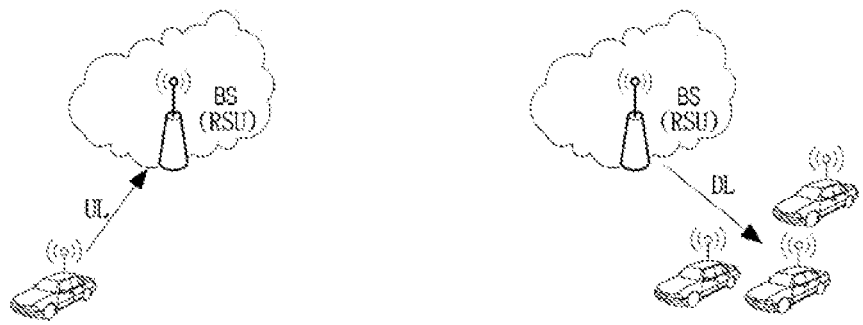
Figure 2:
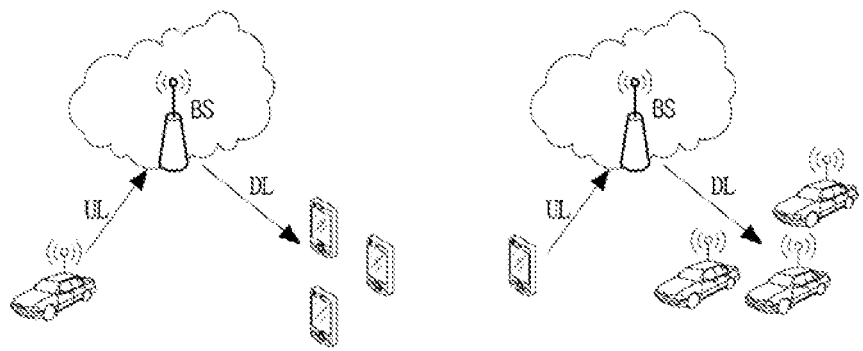
Figure 3:
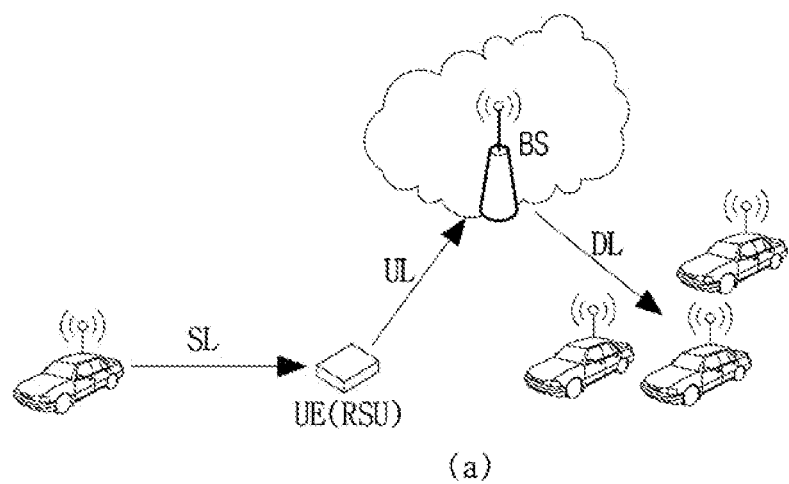
FIG. 3 illustrates examples of a vehicle-to-everything (V2X) scenario to which the present disclosure may apply.
Figure 3:
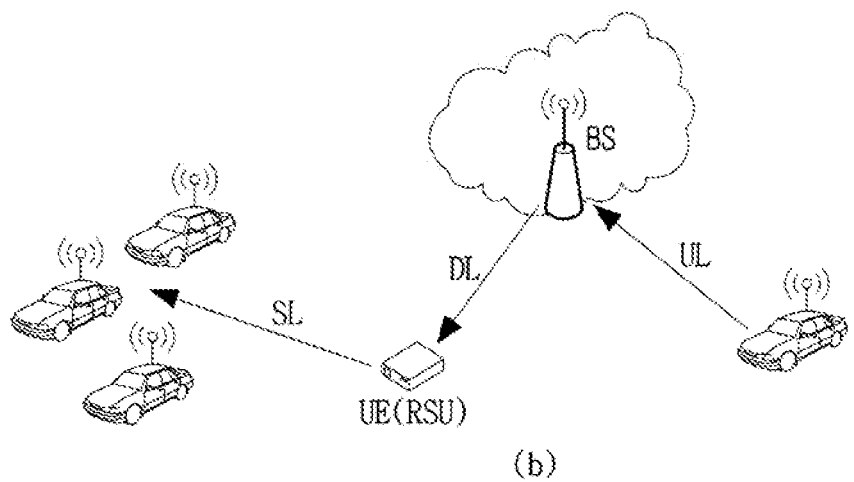

FIGS. 1 to 3 illustrate V2X scenarios which the present disclosure could be applied.

FIG. 1 may be a scenario of performing communication based on the aforementioned sidelink. FIG. 2 may be a scenario of performing a V2X operation using communication between a UE (or a vehicle) and a BS. FIG. 3 may be a scenario of performing communication using all of the aforementioned sidelink and communication with the BS.

For example, in the description related to V2X, the UE may be a vehicle. In the description related to V2X, the UE and the vehicle are collectively referred to as the UE. For example, the UE may refer to a device capable of performing communication with a sidelink and a BS, and may include a vehicle for V2X.

Also, in relation to V2X, D2D (Device to Device) may refer to communication between UEs. Also, the term "proximity-based service (ProSe)" may indicate a proximity service to a UE that performs D2D communication. Also, SL (sidelink) may be the aforementioned sidelink and sidelink control information (SCI) may indicate control information related to the aforementioned sidelink. Also, a Physical Sidelink Shared Channel (PSSCH) may be a channel used to transmit data through a sidelink and a Physical Sidelink Control Channel (PSCCH) may be a channel used to transmit control information through a sidelink. Also, a Physical Sidelink Broadcast Channel (PSBCH) may be a channel used to broadcast a signal through a sidelink and to forward system information. Also, a Physical Sidelink Feedback Indication Channel (PSFICH) may be a channel used for directing feedback information as a sidelink feedback channel. Also, a sidelink synchronization signal (SLSS) may be a synchronization signal for sidelink and physical sidelink synchronization identity (PSSID) may be ID information for sidelink synchronization.

Also, $n_{ID}^{SA}$ (Sidelink group destination identity) may be ID information for distinguishing a sidelink group, and $N_{ID}^{SL}$ (Physical sidelink synchronization identity) may be ID information for sidelink synchronization. V2V may mean vehicle-to-vehicle communication, V2P may mean communication between vehicles and pedestrians, and V2I/N may mean communication between vehicles and infrastructure/networks.

The terms SA, TB, TI, and RB may be the same terms used in the existing LTE. for example, in V2X communication, control information transmitted from a UE to another UE may be scheduling assignment (SA). If the aforementioned control information is used for sidelink communication, the control information may be SCI. Herein, the SCI may be transmitted through the PSCCH. Also, a portion of the SCI may be transmitted through the PSCCH and another portion may be transmitted through the PSSCH.

In V2X communication, data transmitted from a UE to another UE may be configured based on a unit of a transport port (TB). Here, the sidelink data may be transmitted through the PSSCH.

Next, herein, an operation mode may be defined based on a resource allocation method for transmitting data and control information for V2X communication or direct link (e.g., D2D, ProSe, or SL) communication.

For example, an eNodeB resource scheduling mode may be a mode in which an eNodeB or a relay node schedules resources used for a UE to transmit V2X (or direct link) control information and/or data. Through this, the UE may transmit the V2X (or direct link) control information and/or data. This mode may refer to the eNodeB resource scheduling mode.

For more detailed example, the eNodeB or the relay node may provide, to a sidelink (or direct link) transmitting UE, scheduling information about resources used to transmit sidelink (or direct ink) control information and/or data through downlink control information (DCI). Therefore, the sidelink (or direct link) transmitting UE may transmit the sidelink (or direct link) control information and data to a sidelink (or direct link) receiving UE, and the sidelink (or direct link) receiving UE may receive sidelink (or direct link) data based on the sidelink (or direct link) control information.

Also, a UE autonomous resource selection mode may be a resource allocation mode in which a UE autonomously selects resources used to transmit control information and data. The resource selection of the UE may be determined through sensing of the UE from a resource pool (i.e., a set of resource candidates). On the selected resource, the UE may transmit V2X (or direct link) control information and/or data.

For more detailed example, the sidelink (or direct link) transmitting UE may transmit sidelink (or direct link) control information and data to the sidelink (or direct link) receiving UE using its selected resource, and the sidelink (or direct link) receiving UE may receive sidelink (or direct link) data based on sidelink (or direct link) control information.

The aforementioned BS resource scheduling mode may be referred to as Mode 1 in sidelink (or direct link) communication for D2D and the like. Also, the BS resource scheduling mode may be referred to as Mode 3 in sidelink communication for V2X and the like. Also, the UE autonomous resource selection mode may be referred to as Mode 2 in sidelink (or direct link) communication for D2D and the like. Also, the UE autonomous resource selection mode may be referred to as Mode 4 in sidelink communication for V2X and the like. However, they are provided as examples only and the present disclosure is not limited thereto. That is, they may be regarded as the same mode with respect to the same target and the same operation.

For example, in NR V2X, BS resource scheduling mode may be referred to as mode 1 (Mode 1) and the UE autonomous resource selection mode may be referred to as mode 2 (Mode 2).

Although the following description is made based on V2X communication for clarity of description, it is not limited thereto. For example, the present disclosure may apply alike to communication based on a direct link such as D2D, ProSe, and the like.

Also, for example, V2X may be a general term for V2V, V2P, and V2I/N. Here, each of V2V, V2P, and V2I/N may be defined as the following Table 1, however, it is not limited thereto. That is, the following Table 1 is provided as an example only and not limited thereto.

TABLE 1

| | |
|---|---|
| V2V | LTE or NR based communication between a vehicle and another vehicle |
| V2P | LTE or NR based communication between a vehicle and a device carried by an individual (e.g., a terminal carried by a pedestrian, a cyclist, a driver, or a passenger) |
| V2I/N | LTE or NR based communication between a vehicle and a roadside unit(RSU)/network<br>The RSU refers to a suspended social infrastructure entity that supports V2X applications and may exchange messages with other independent entities that support V2X applications.<br>The RSU is a logical independent entity integrated with a V2X application logic having functions of a BS (in this case, referable as a BS-type RSU) or a UE (in this case, referable as a UE-type RSU). |

Also, V2X communication may include PC5 based communication that is an interface for sidelink communication.

For example, the following Table 2 and FIG. 1 may refer to a scenario for supporting a V2X operation based on a PC5 interface (or SL). Here, (a) of FIG. 1 illustrates an example of a V2V operation, (b) of FIG. 1 illustrates an example of a V2I operation, and (c) of FIG. 1 illustrates an example of a V2P operation. That is, FIG. 1 illustrates a method of performing communication based on the sidelink (SL). Here, communication may be performed without a BS.

TABLE 2

Scenario that supports a V2X operation operating based on only PC5
In this scenario, a UE transmits a V2X message to a plurality of UEs present in a local area through a sidelink.
With respect to V2I, a transmitter UE or receiver UE(s) may be a UE-type roadside unit (RSU).
With respect to V2P, a transmitter UE or receiver UE(s) may be a pedestrian UE.

Meanwhile, the following Table 3 and FIG. 2 may refer to a scenario for supporting a V2X operation based on a Uu interface (i.e., an interface between a UE and a BS). Here, (a) of FIG. 2 illustrates an example of a V2V operation, (b) of FIG. 2 illustrates an example of a V2I operation, and (c) of FIG. 2 illustrates an example of a V2P operation. That is, the V2X operation may be supported using communication between a UE and a BS.

TABLE 3

Scenario that supports a V2X operation operating based on only Uu interface
In this scenario,
With respect to V2V and V2P, a UE transmits a V2X message to a BS through an uplink, and the BS transmits the V2X message to a plurality of UEs present in a local area through a downlink.
With respect to V2I, if a receiver is a BS-type RSU, a UE transmits a V2I message to a BS (BS-type RSU) through an uplink; and if a transmitter is a BS-type RSU, the BS (BS-type RSU) transmits the V2I message to a plurality of UEs present in a local area.
With respect to V2P, a transmitter UE or receiver UE(s) may be a pedestrian UE.
To support this scenario, the BS performs uplink reception and downlink transmission of a V2X message and uses a broadcast mechanism with respect to a downlink.

The following Table 4 and FIG. 3 may refer to a scenario for supporting a V2X operation that uses all of a UE interface and PC5 interface (or SL). Here, (a) of FIG. 3 illustrates Scenario 3A of Table 4 and (b) of FIG. 3 illustrates Scenario 3B of Table 4.

In detail, referring to (a) of FIG. 3, a UE may transmit a V2X message to other UEs through a sidelink. One of the UEs receiving the V2X message may transmit the V2X message to a BS through an uplink (UL). The BS may receive the V2X message and may transmit a message based on the V2X message to other neighboring UEs through a downlink (DL). Here, for example, the downlink transmission may be performed using a broadcast method.

Referring to (b) of FIG. 3, a UE may transmit a V2X message to a BS through an uplink (UL) and the BS may transmit the V2X message to at least one UE or RSU. In response thereto, the UE or the RSU may transmit the received message to a plurality of neighboring UEs through a sidelink (SL).

In (a) and (b) of FIG. 3, the V2X operation may be supported using all of communication between the BS and the UE and the sidelink.

TABLE 4

Scenario in which a UE transmits a V2X message to other UEs through a sidelink

| | |
|---|---|
| Scenario 3A | In this scenario, a UE transmits a V2X message to other UEs through a sidelink. One of a plurality of receiver UEs is a UE-type RSU and receives the V2X message through the sidelink and transmits the V2X message to a BS through an uplink. The BS receives the V2X message from the UE-type RSU and transmits the V2X message to a plurality of UEs present in a local area through a downlink. To support this scenario, the BS performs uplink reception and downlink transmission of the V2X message, and uses a broadcast mechanism with respect to the downlink. |
| Scenario 3B | In this scenario, a UE transmits a V2X message to a BS through an uplink. The BS transmits the V2X message to at least one UE-type RSU. The UE-type RSU transmits the V2X message to other UEs through a sidelink. To support this scenario, the BS performs uplink reception and downlink transmission of the V2X message, and uses a broadcast mechanism with respect to the downlink. |

As described above, the V2X communication may be performed through the BS and may be performed through direct communication between UEs. Here, if the BS is used, transmission and reception may be performed through a Uu link that is a communication interface between an LTE BS and UE in LTE-based V2X communication. Also, if the sidelink is used for the direct communication between UEs, transmission and reception may be performed through a PC5 link that is a communication interface between LTE UEs in the LTE-based V2X communication.

For example, even in an NR system, the V2X communication may be performed using communication between a UE and a BS and a sidelink between UEs. Here, there may be a difference between a communication (uplink/downlink) method between the BS and the UE in the NR system. For example, the communication methods may be similar in terms of some features and there may be some changes based on the NR system that is a new system. Also, for example, there may be a difference between the sidelink in the NR system and the sidelink in the existing system. That is, there may be some changes in the sidelink based on the NR system that is a new system by considering the aforementioned communication difference between the BS and the UE.

Figure 4:
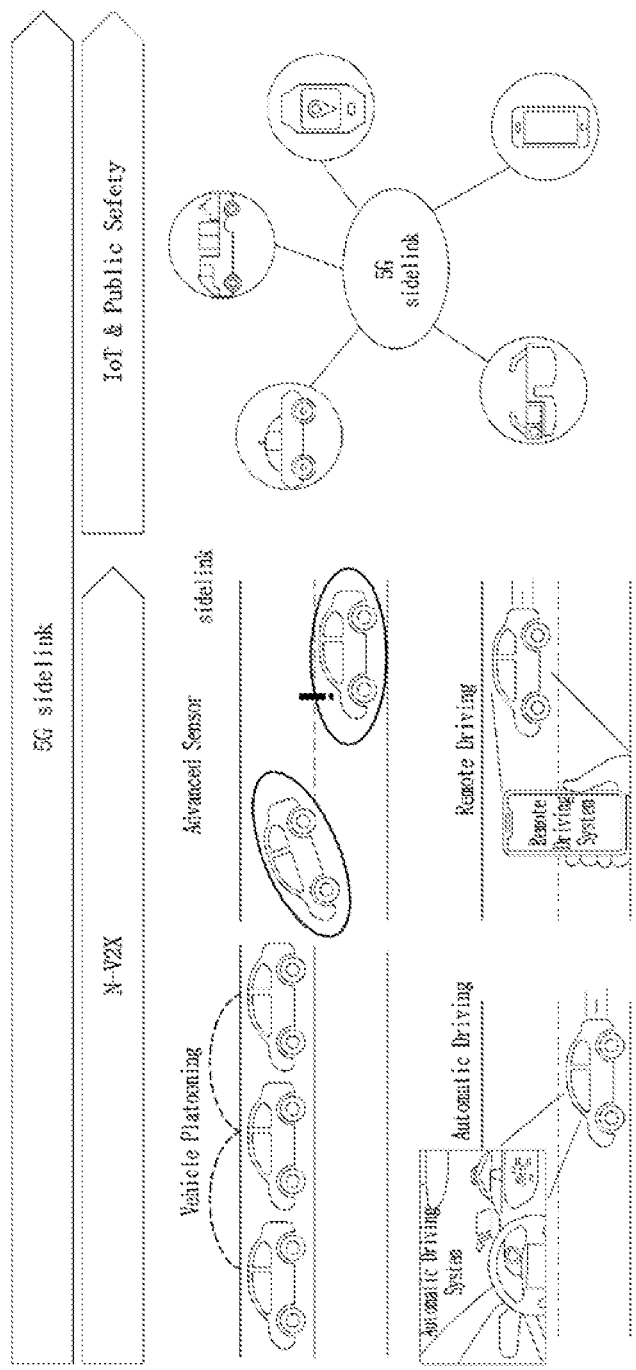
FIG. 4 illustrates an example of a service provided based on a sidelink to which the present disclosure may apply.

FIG. 4 illustrates an example of a service provided based on a sidelink to which the present disclosure may apply.

Referring to FIG. 4, a V2X related service or an Internet of Things (IoT) service may be provided based on a 5G sidelink. Here, for example, the 5G sidelink may be a concept that includes all of a sidelink based on an existing LTE system and a sidelink based on an NR system. That is, the 5G sidelink may be a service that is provided by considering the sidelink applied in each system.

For example, referring to FIG. 4, with respect to a V2X service, a vehicle platooning, an automatic driving, an advanced sensor, and a remote driving service may be provided. Here, the vehicle platooning may refer to technology that allows a plurality of vehicles to dynamically form a group and operate in a similar manner. Also, the automatic driving may refer to technology that drives a vehicle based on a complete automation and a semi-automation. Also, the advanced sensor may refer to technology that collects and exchanges data acquired from a sensor or a video image. Also, the remote driving may refer to technology for remotely controlling a vehicle and technology for an application. That is, the aforementioned services may be provided as a V2X-based service. Here, the services are provided as examples only and the present disclosure is not limited thereto. Here, requirements, such as ultra latency, ultra connectivity, low power, and high reliability, may be required to provide the V2X service. Therefore, the 5G sidelink may require an operation method for meeting the services and the requirements according thereto. A detailed method considering the requirements is described in the following.

Hereinafter, the physical resource structure of the NR system is described.

Figure 5:
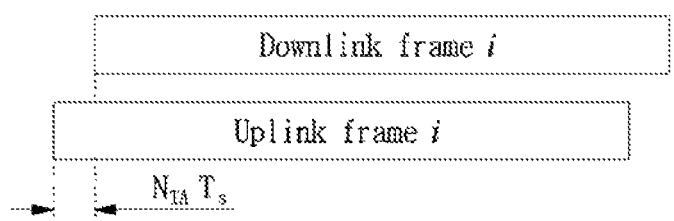
FIG. 5 illustrates an example of a new radio (NR) frame structure to which the present disclosure may apply.

FIG. 5 illustrates examples of a frame structure for the NR system to which the present disclosure may be applied.

In NR, a basic unit of a time domain may be $T_c=1/(\Delta f_{max} \cdot N_f)$. Here, $\Delta f_{max}=480 \cdot 10^3$ and $N_f=4096$. In LTE, $T_s=1/(\Delta f_{ref} \cdot N_{f,ref})$, $\Delta f_{ref}=15 \cdot 10^3$ Hz, and $N_{f,ref}=2048$ may be defined as a reference time unit. The constant for the multiples relationship between the NR reference time unit and the LTE reference time unit may be defined as $\kappa=T_s/T_c=64$.

Referring to FIG. 5, a time structure of a frame for a downlink/uplink (DL/UL) transmission may include $T_f=(\Delta f_{max} N_f/100) \cdot T_s=10$ ms. Here, a single frame may include 10 subframes corresponding to $T_{sf}=(\Delta f_{max} N_f/1000) T_s=1$ ms. A number of consecutive OFDM symbols per subframe may be $N_{symb}^{subframe,\mu} = N_{symb}^{slot} N_{slot}^{subframe,\mu}$. Also, each frame may be divided in two half frames and the half frames may include 0-4 subframes and 5-9 subframes. Here, half frame 1 may include 0-4 subframes and half frame 2 may include 5-9 subframes.

Referring to FIG. 5, $N_{TA}$ shows a timing advance (TA) between the downlink (DL) and the uplink (UL). Here, a transmission timing of uplink transmission frame i is determined based on a downlink reception time at a UE according to the following Equation 1.

$$T_{TA}=(N_{TA}+N_{TA,offset}) \cdot T_C \quad \text{[Equation 1]}$$

In Equation 1, $N_{TA,offset}$ denotes a TA offset occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

Figure 6:
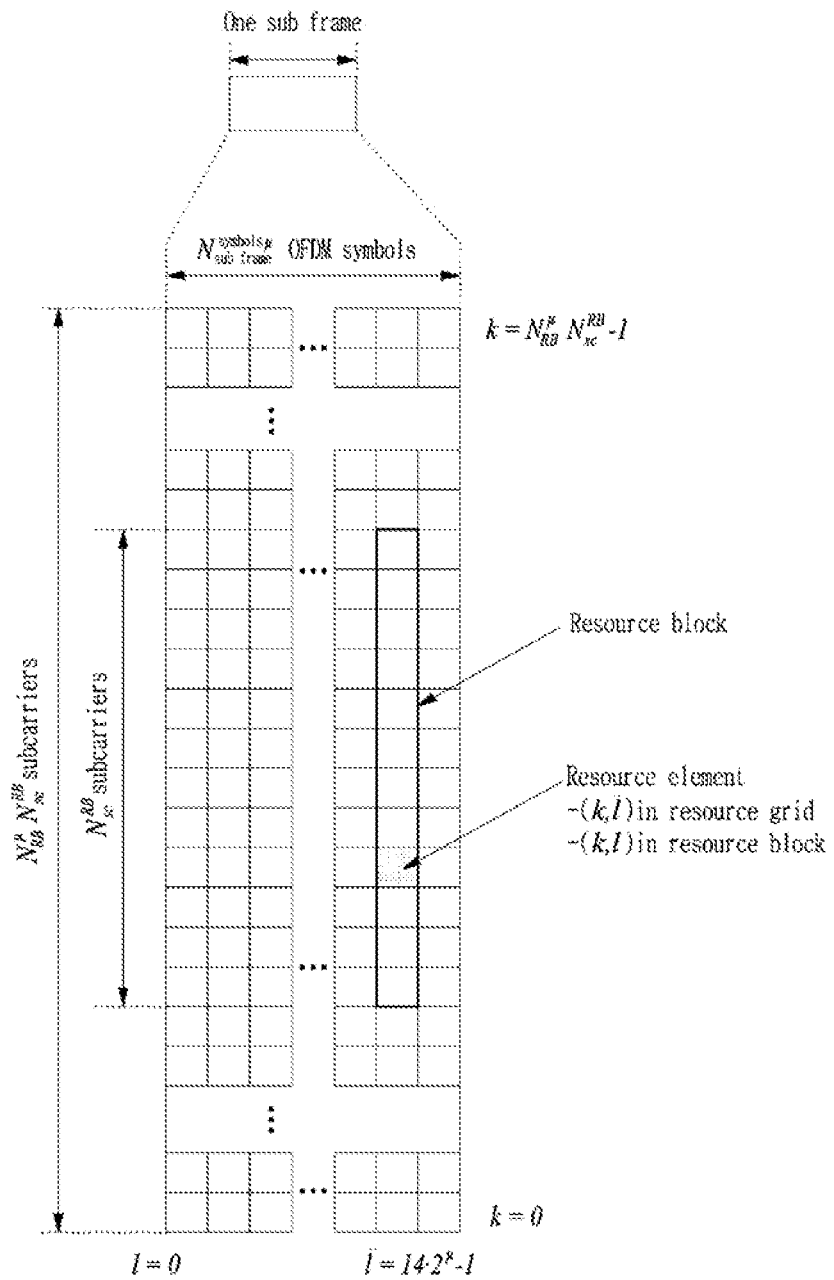
FIG. 6 illustrates an NR resource structure to which the present disclosure may apply.

FIG. 6 illustrates an NR resource structure to which the present disclosure may apply.

A resource element within a resource grid may be indexed based on each subcarrier spacing. Here, a single resource grid may be generated for each antenna port and for subcarrier spacing. Uplink/downlink transmission and reception may be performed based on a corresponding resource grid.

A single resource block is configured on a frequency domain using 12 resource elements and configures an index n_PRB for a single resource block every 12 resource elements. An index of the resource block may be used in a specific frequency band or system bandwidth. The index for the resource block may be defined as shown in Equation 2. Herein, $N^{RB}_{sc}$ means the number of subcarriers per resource block and k means the subcarrier index.

$$n_{PRB} = \left\lfloor \frac{k}{N^{RB}_{sc}} \right\rfloor \qquad [\text{Equation 2}]$$

Numerologies may be variously configured to meet various services and requirements of the NR system. For example, a plurality of subcarrier spacings (SCSs) may be supported, which differs from the existing LTE/LTE-A system that supports a single SCS.

A new numerology for the NR system that includes supporting the plurality of SCSs may operate in the frequency range or carrier, such as 3 GHz or less, 3 GHz-6 GHz, or 6 GHz-52.6 GHz, to solve an issue that a wide bandwidth is unavailable in the existing frequency range or carrier, such as 700 MHz or 2 GHz. However, the scope of the present disclosure is not limited thereto.

Table 5 below shows an example of the numerology supported by the NR system.

TABLE 5

| u | Δf = $2^u$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the Table 5, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

For example, referring to the following Table 5, if µ=2 and SCS=60 kHz, a normal CP and an extended CP may be applied. In other numerology index, only the normal CP may be applied.

A normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as a Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to =1 and 2 may be used in the unlicensed band of 6 GHz or less and an SCS corresponding to =3 and 4 may be used in the unlicensed band above 6 GHz.

TABLE 6

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 6 shows, in the case of normal CP, a number of OFDM symbols per slot ($N_{slot}^{symb,\mu}$), a number of slots per frame ($N_{slot}^{frame,\mu}$), and a number of slots per subframe ($N_{slot}^{subframe,\mu}$) for each SCS setting parameter µ, as provided by Table 6. Here, in Table 6, the values are based on the normal slot having 14 OFDM symbols.

TABLE 7

| u | $N^{slot}_{symb}$ | $N^{frame,u}_{slot}$ | $N^{subframe,u}_{slot}$ |
|---|---|---|---|
| 2 | 12 | 40 | 4 |

Table 7 shows, in the case the extended CP may be applied (µ=2 and SCS=60 kHz), a number of slots per frame and a number of slots per subframe based on the normal slot of which the number of OFDM symbols per slot ($N_{slot}^{symb,\mu}$) is 12.

Also, as described above, a single subframe may correspond to 1 ms on a time axis. Also, a single slot may correspond to 14 symbols on the time axis. Also, for example, a single slot may correspond to 7 symbols on the time axis. Therefore, a number of slots and a number of symbols available in 10 ms corresponding to a single radio frame may be differently set. Table 8 shows a number of slots and a number of symbols according to each SCS. Here, for example, an SCS of 480 kHz may not be considered and the present disclosure is not limited thereto.

TABLE 8

| SCS | Number of Slots within 10 ms (14 symbols per slot) | Number of Slots within 10 ms (7 symbols per slot) | Number of symbols within 10 ms |
|---|---|---|---|
| 15 kHz | 10 | 20 | 140 |
| 30 kHz | 20 | 40 | 280 |

TABLE 8-continued

| SCS | Number of Slots within 10 ms (14 symbols per slot) | Number of Slots within 10 ms (7 symbols per slot) | Number of symbols within 10 ms |
|---|---|---|---|
| 60 kHz | 40 | 80 | 560 |
| 120 kHz | 80 | N/A | 1120 |
| 240 kHz | 160 | N/A | 2240 |
| 480 kHz | 320 | N/A | 4480 |

Figure 7:
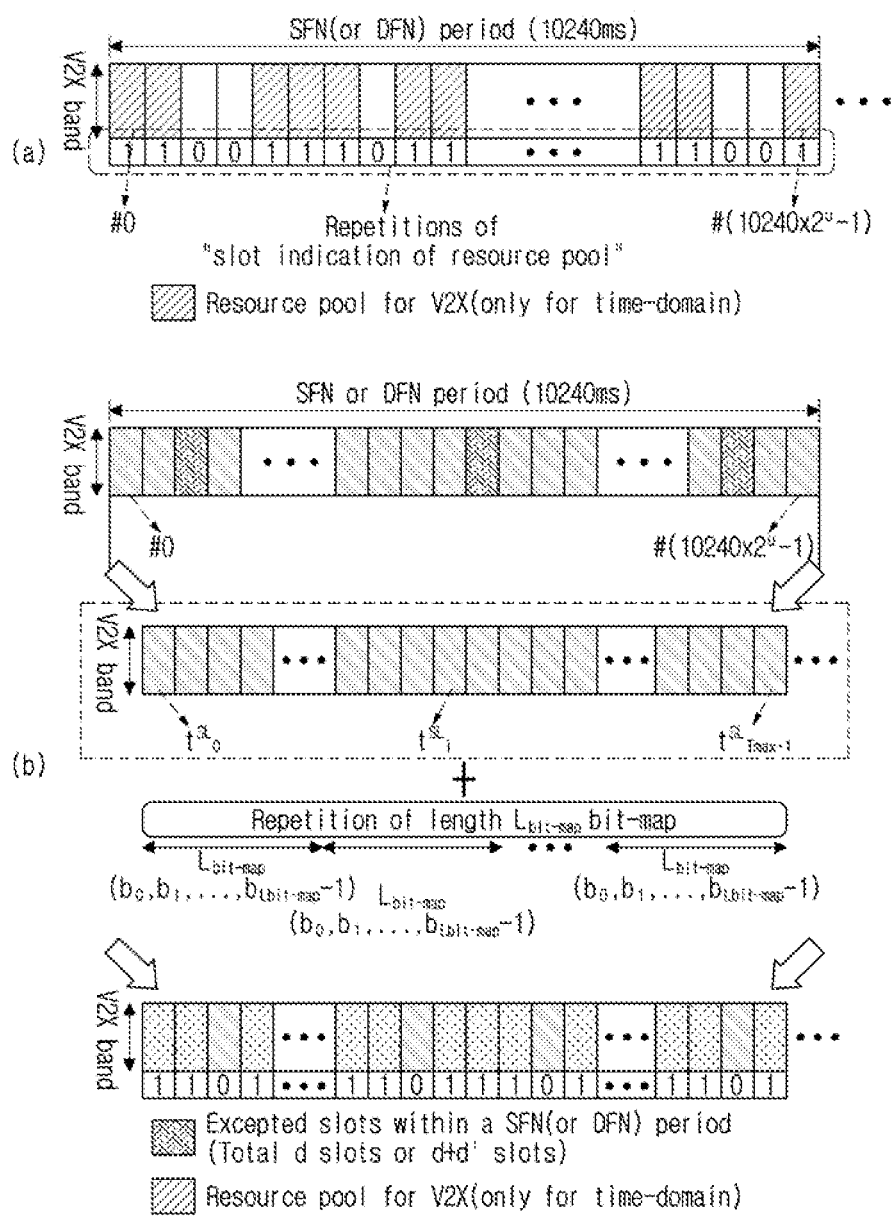
FIG. 7 illustrates examples of a V2X resource pool configuration to which the present disclosure may apply.
Figure 8:
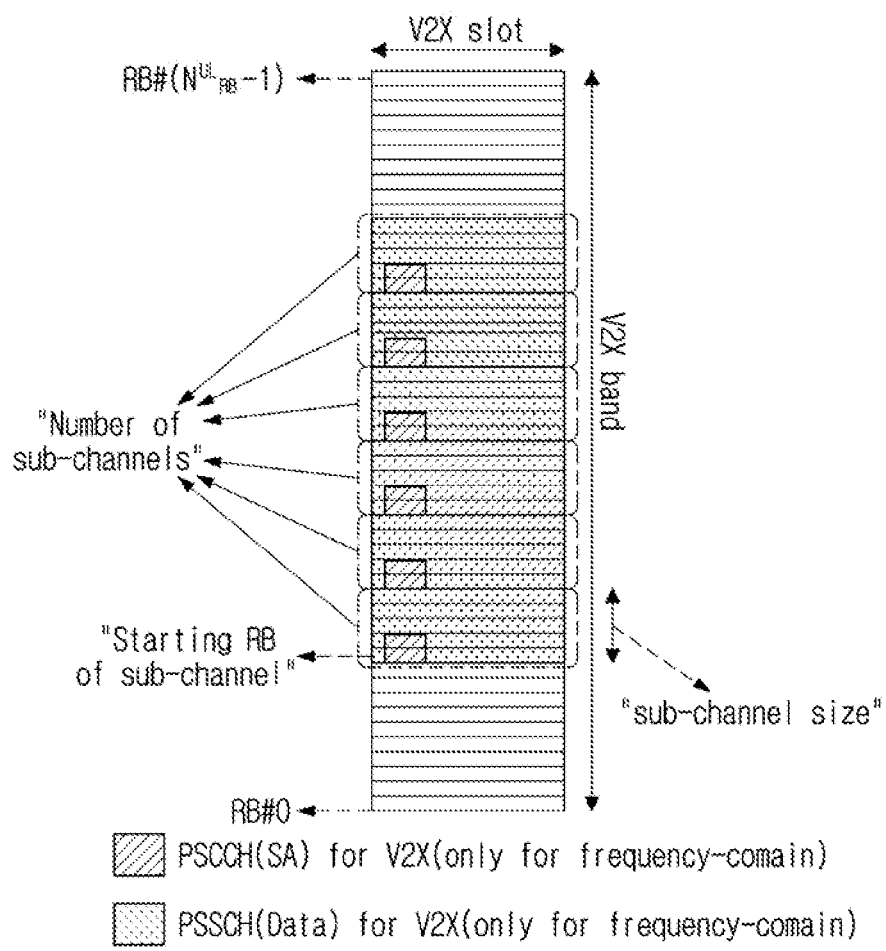
FIG. 8 illustrates examples of a V2X resource pool configuration to which the present disclosure may apply.

FIGS. 7 and 8 illustrate examples of V2X resource pool configuration to which the present disclosure may apply.

Referring to FIGS. 7 and 8, a method of configuring a resource pool for a control channel (PSCCH) through which scheduling assignment (SA) is transmitted and a data channel (PSSCH) through which data related thereto is transmitted in V2X is described. Here, the resource pool may refer to a set of resource candidates available for transmission of SA and/or data. Each resource pool may be called a slot pool in a time domain and may also be called a resource block pool in a frequency domain. Here, the resource pool as in the examples of FIGS. 7 and 8 may be one for vehicle (V)-UE in V2X. Also, the resource pool configuration method as in the examples of FIGS. 7 and 8 are provided as an example only and the resource pool may be configured using another method.

The resource pool as in the examples of FIGS. 7 and 8 may be defined in a UE autonomous resource selection mode (or mode 2).

In a BS resource scheduling mode (or mode 1), all of sidelink slots (e.g., corresponding to all of uplink slots in NR) in the time domain and resources corresponding to all of resource blocks (RBs) within V2X carrier or band in the frequency domain may be a set of resource candidates available for transmitting SA and/or data. Also, even in the BS resource scheduling mode (or mode 1), a set of resource candidates available for transmitting SA and/or data may be configured by separately defining the resource pool as in the UE autonomous resource selection mode (or mode 2).

That is, the resource pool according to the present disclosure described with reference to FIGS. 7 and 8 may be defined in the UE autonomous resource selection mode (or mode 2) and/or the eNodeB resource scheduling mode (or mode 1).

Hereinafter, the slot pool corresponding to the resource pool in the time domain will be further described.

FIG. 7 illustrates slots in which the resource pool is configured in the time domain, with respect to the resource pool. Referring to FIG. 7, slots for the resource pool for V2X may be defined by indicating a repetition of a bitmap with respect to all of the slots excepting specific slots. The slots for the resource pool for V2X may be slots in which transmission and/or reception of SA and/or data is allowed for the resource pool in V2X.

Here, slots to be excepted from bitmap repetitions may include slots used for transmission of a Sidelink Signal Block (SSB) including a Primary Sidelink Synchronization Signal (PSSS), a Secondary Sidelink Synchronization Signal (SSSS), and a Physical Sidelink Broadcast Channel (PSBCH). Also, the excepted slots may further include downlink (DL) slots or flexible slots, not uplink (UL) slots available as sidelink (SL) slots in TTD. Here, the excepted slots are not limited to the aforementioned example.

For example, excepted slots within a system frame number (SNF) or a D2D frame number (DFN) period may include d non-uplink slots and slots for SSB. Also, the excepted slots may further include d' slots that are additionally excepted such that a bitmap with a length of Lbitmap may be repeatedly applied by an integer multiple within the SFN or DFN period. Here, the excepted slots are not limited to the aforementioned example.

Also, the repeatedly applied bitmap may be indicated with upper layer signaling (signaling field "slot indication of resource pool" in FIG. 7) such as RRC and the like. A length of the signaling field may be 16, 20, or 100, but is not limited thereto. If the bitmap value is 1, it may indicate a slot for the resource pool. If the bitmap value is 0, it may indicate a slot that does not belong to the resource pool. Here, a value of u of FIG. 7 may follow a value defined in Table 5 to Table 7 as a value according to a Subcarrier Spacing (SCS).

Next, the resource block pool corresponding to the resource pool in the frequency domain will be further described.

FIG. 8 illustrates slots in which the resource pool is configured in the frequency domain. Referring to FIG. 8, a PSCCH that transmits SA and a PSSCH that transmits data within the resource pool may be simultaneously transmitted in a single sub-channel. Here, the PSSCH may be transmitted over the entire sub-channel, whereas the PSCCH may be transmitted in a portion of the sub-channel.

Referring to FIG. 8, in a slot in which the resource pool is configured in the time domain for V2X "Starting RB of sub-channels" may be defined based on a single RB unit with respect to all of RBs (RB #0 to RB #($N_{RB}^{UL}-1$)) in the frequency domain (here, $N_{RB}^{UL}$ denotes a total number of RBs corresponding to a system bandwidth for uplink (UL) and V2X for a sidelink is defined in a UL band and thus, UL may be replaced with SL (i.e., $N_{RB}^{SL}$ may be applied instead of $N_{RB}^{UL}$). The signaling field "Starting RB of sub-channels" may be indicated through upper layer signaling, such as RRC and the like. Consecutive RBs corresponding to a total number of K sub-channels starting from RB indicated with such "Starting RB of sub-channels" belong to the resource pool. Here, a number of RBs that constitute a single sub-channel may be indicated with a signaling field "Sub-channel size" and the number of K sub-channels may be indicated with a signaling field "Number of sub-channels" through upper layer signaling such as RRC.

For example, "Sub-channel size" $N_{subchannel}$ may be 10, 15, 20, 25, 50, 75, or 100 RBs, but without being limited thereto, 4, 5, or 6 RBs may be used. Also, referring to FIG. 8, the PSCCH for SA allocated to a portion of the sub-channel may be allocated to X RBs within the sub-channel. Here, X≤$N_{subchannel}$.

Figure 9:
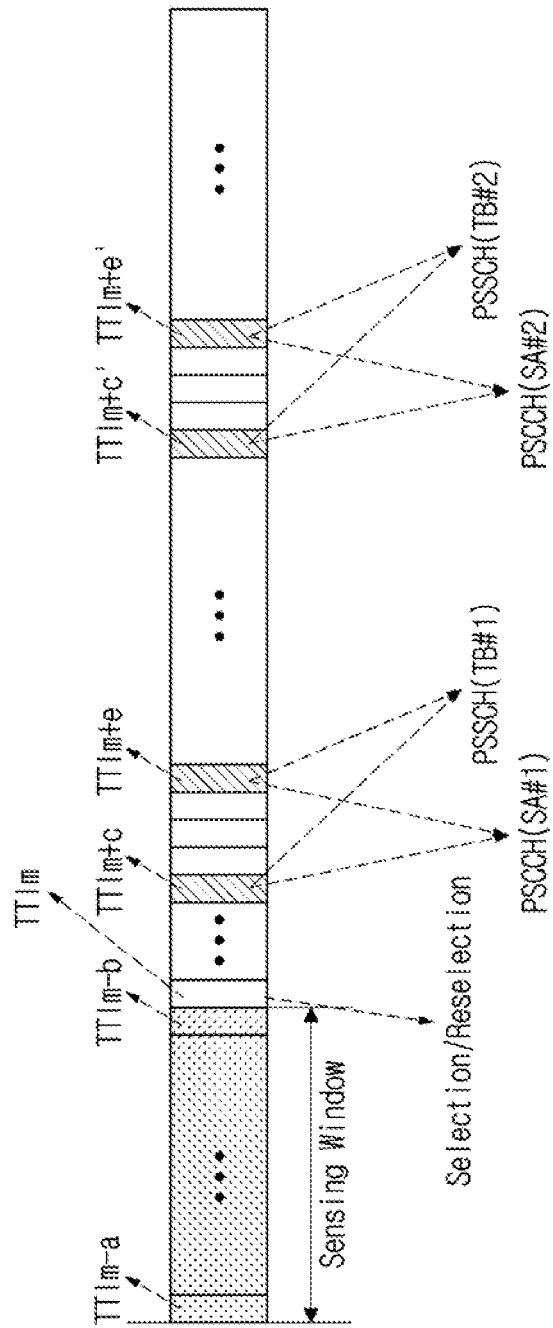
FIG. 9 illustrates an example of a sidelink transmission slot determination method based on a user equipment (UE) sensing to which the present disclosure may apply.

FIG. 9 illustrates an example of a sidelink transmission slot determination method based on a UE sensing to which the present disclosure may apply.

In the UE autonomous resource selection mode (or mode 2), a UE may autonomously determine slots in which the PSCCH for SA and the PSSCH for data are transmitted.

TABLE 9

| Notation related to FIG. 9 | Specific parameter value | Possible actual value (example) | Possible indication method |
|---|---|---|---|
| a | a = $T_o$ | $T_o$ = 1000 · $2^u$ (slots) | (pre-)configured |
| b | b = $T_{proc,\,0}$ | $T_{proc,\,0}$ = 1, 2, 3 or 4 (slots) | fixed |
| $T_1 \leq c \leq T_2$ | $T_1 \leq T_{proc,\,1}$ | $T_{proc,\,1}$ = 3, 5, 9 or 17 (slots) | fixed |
| | $T_2 \geq T_{2,\,min}$ | $T_{2,\,min}$ = 5 · $2^u$, 10 · $2^u$ or 20 · $2^u$ (slots) | (pre-)configured |
| e-c | | 0~31 (slots) | indicated by SCI |
| c'-c | $P_{rsvp}$ | 0, 1, 2, . . . , 99, 100, 200, 300, . . . , 1000 (ms) | (pre-)configured + indicated by SCI |

FIG. 9 illustrates a method of selecting slots for transmitting a control channel and a data channel by sensing in a resource pool for transmission of the control channel (PSCCH) and the data channel (PSSCH) related thereto.

In a sensing window corresponding to a duration from "TTI m-a" to "TTI m-b", the UE may verify a resource that has been occupied and used by another UE through sensing. Based thereon, the UE may select a resource from among remaining resources excluding a resource occupied and used or to be used by the other terminal from among resources that belong to the resource pool. That is, sensing a specific resource for resource selection may include referencing whether a resource corresponding to the specific resource is occupied or used within the sensing window (i.e., at a previous point in time based on the specific resource). Since a sidelink resource allocation may have a periodic characteristic, a resource to be sensed in the resource pool (or a selection window) may correspond to a sensing reference resource within a previous sensing window. For example, when the sensing reference resource within the sensing window corresponding to the resource to be sensed in the resource pool (or the selection window) is used, it may be assumed that the corresponding resource to be sensed in the resource pool (or the selection window) is highly to be occupied or used by the other UE. Therefore, a transmission resource may be selected from among the remaining resources excluding the corresponding resource from the resource pool. Therefore, the UE may perform transmission of the control channel and/or the data channel on the selected resource.

Also, "TTI m" corresponding to a time at which the UE determines a selection/reselection corresponds to a time at which a corresponding TB arrives (i.e., a TB generated in an upper layer of the UE arrives at a physical layer).

In detail, it may be expressed as a=$T_O$ and may be expressed as b=$T_{proc,0}$. Here, a length of the sensing window corresponding to a duration from "TTI m-a" to "TTI m-b" may be expressed as a−b+1. For example, a=$T_O$=1000·$2^u$ and b=$T_{proc,0}$=1. Here, the sensing window corresponds to a duration from slot "TTI m−1000·$2^u$" to slot "TTI m−1" and the length of the sensing window (corresponding to "a−b+1=$T_O$−$T_{proc,0}$+1=$T_O$−1+1=$T_O$") corresponds to 1000·$2^u$ slots and thus, may be 1000 ms. Although 1000 ms corresponding to $T_O$=1000·$2^u$ slots is used as an example above, it is provided as an example only and 1100 ms or 100 ms is possible. Here, $T_O$ is (pre-)configured as one of the aforementioned values and a value fixed to $T_{proc,0}$−1 may be used.

"TTI m+c" may correspond to a TTI for transmission of SA #1 (first SA) (or, if a single TTI corresponds to a single slot, a slot for transmission of SA #1 (first SA)). "TTI m+d" may correspond to a TTI for initial transmission of TB #1 (first TB) that is instructed by SA #1 (first SA) and transmitted (or if a single TTI corresponds to a single slot, a slot for initial transmission of TB #1 (first TB)). "TTI m+e" may correspond to a TTI for retransmission of TB #1 (first TB) that is instructed by SA #1 (first SA) and transmitted (or, if a single TTI corresponds to a single slot, a slot for retransmission of TB #1 (first TB)).

In the example of FIG. 9, since it is considered that SA and data are transmitted in the same slot in V2X, c=d.

Here, after initial transmission in "TTI m+c", only retransmission in "TTI m+e" is mentioned. However, retransmission may be performed up to three times by a value of $N_{max}$. For example, if $N_{max}$=1, only the initial transmission in "TTI m+c" may be present. If $N_{max}$=2, the initial transmission in "TTI m+c" and the retransmission in "TTI m+e" may be present. If $N_{max}$=3, the initial transmission in "TTI m+c", the retransmission in "TTI m+e", and, although not illustrated, retransmission in "TTI m+f" may be present.

"TTI m+c'" may correspond to a TTI for transmission of SA #2 (second SA) (or, if a single TTI corresponds to a single slot, a slot for transmission of SA #2 (second SA)). "TTI m+d'" may correspond to a TTI for initial transmission of TB #2 (second TB) instructed by SA #2 (second SA) and transmitted (or, if a single TTI corresponds to a single slot, a slot for initial transmission of TB #2 (second TB)). "TTI m+e'" may correspond to a TTI for retransmission of TB #2 (second TB) that is instructed by SA #2 (second SA) and transmitted (or, if the single TTI corresponds to a single slot, a slot for retransmission of TB #2 (second TB)).

In the example of FIG. 9, since it is considered that SA and data are transmitted in the same slot in V2X, c'=d'.

Here, referring to Table 9, $T_1 \leq c \leq T_2$, $T_1 \leq T_{proc,1}$, and $T_2 \geq T_{2,min}$. Here, if u=0, 1 (i.e., if SCS=15 kHz, 30 kHz), it may be fixed to a value corresponding to $T_{proc,1}$=3 slots. Also, if u=2, 3 (i.e., if SCS=60 kHz, 120 kHz), it may be fixed to a value corresponding to $T_{proc,1}$=4 slots. Also, $T_{2,min}$ may be (pre-)configured as a value corresponding to 5·$2^u$, 10·$2^u$, or 20·$2^u$ slots.

Also, a value of "e−c" corresponding to a duration between initial transmission and retransmission of the same TB may be indicated through SCI as a value corresponding to 0, 1, 2, . . . , 31 slots. If the value is zero, it indicates that there is no retransmission after the initial transmission. If the value is $N_{retransmission} \in \{1, 2, . . . , 31\}$, it may indicate that retransmission of the same TB is present after $N_{retransmission}$ slots from the initial transmission.

In detail, resources for the initial transmission and the retransmission of the same TB may be defined within a W duration and, here, W corresponds to 32 slots. That is, within the W duration corresponding to 32 slots starting from slot "TTI m+c" corresponding to the initial transmission to "TTI m+c+31", 0, 1, or 2 retransmissions are possible according to the aforementioned value of $N_{max}$ after the initial transmission. Specifically, in which slot each corresponding retransmission is performed among 32 slots may be indicated through SCI. If $N_{max}=2$, the retransmission is possible in corresponding "TTI m+e" after $N_{retransmission} \in \{1, 2, \ldots 31\}$ slots from "TTI m+c".

Also, it may be expressed as $d'=d+P*j$ (since $c=d$ and $c'=d'$, $c'=c+P*j$) and thus, it may be expressed as $d'-d=c'-c=P*j$. Here, P denotes a resource reservation interval.

A value of P may be determined by upper layer signaling. In this case, the value of P may correspond to one of values corresponding to 0, 1, 2, . . . , 99, 100, 200, 300, . . . , 1000 ms. In the transmitting UE, the value of P may be expressed as $P_{rsvp\_TX}$, and in the receiving UE, the value of P may be expressed as $P_{rsvp\_RX}$. In this case, $P_{rsvp\_TX}$ and $P_{rsvp\_RX}$ may be values in ms unit and if they are converted to logical value in slots, they may be expressed as $P'_{rsvp\_TX}$ and $P'_{rsvp\_RX}$.

Here, j may be determined through carrier-specific network configuration or pre-configuration used for V2X within the range of [0, 1, . . . , 10]. Also, a single value among values selected for j may be selected and indicated through a signaling field "Resource reservation" of SCI included in SA. Here, j=0 indicates that a value of d' is absent, that is, that a resource reservation is absent after a TTI corresponding to "P*j" from "TTI m+d" for transmission of TB #2 (second TB).

A meaning of "indicated by SCI" in Table 9 includes that, in the case of the UE autonomous resource selection mode (or mode 2), a transmitting UE (or a first UE) autonomously determines a corresponding parameter value and then uses a parameter to be used for Table 9 based on the determined value and instructs a receiving UE (second UE) through SCI such that the receiving UE (or the second UE) may know the determined value.

Figure 10:
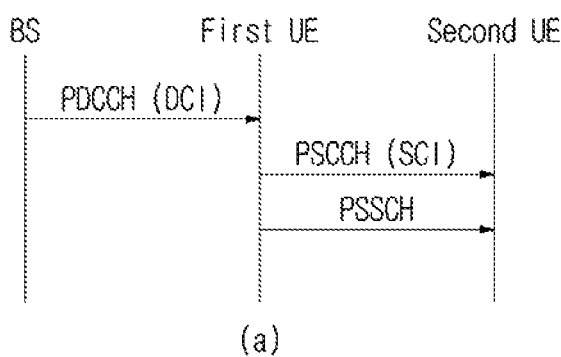
FIG. 10 illustrates a V2X resource allocation method to which the present disclosure may apply.
Figure 10:
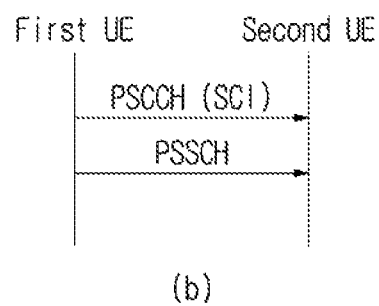

FIG. 10 illustrates a V2X resource allocation method to which the present disclosure may apply.

As described above, in the BS resource scheduling mode (or mode 1), a slot in which SA is transmitted may be a first slot included in a set of the resource candidates that may be used for V2X on a V2X carrier (or band) among slots after Ams (here, A=4, but not limited thereto) from a slot in which the BS transmits DCI. Here, information about a resource block that is a frequency axis resource used for transmission of the SA within the slot in which the SA is transmitted may be indicated through the DCI.

Also, in the BS resource scheduling mode (or mode 1), the DCI includes contents related to the SCI included in the SA as information required for the UE to transmit data in V2X communication. The DCI is transmitted from the BS to the UE.

Here, a first UE may determine sidelink scheduling information based on the DCI and may generate the determined sidelink scheduling information as first SCI and second SC. The first UE may transmit the first SCI to a second UE through a PSCCH and may transmit the second SCI to the second UE through a portion of available PSSCH transmission resources. The second UE may identify a sidelink resource through which the first UE is to transmit sidelink data through a PSSCH based on the first and second SCI received from the first UE. The second UE may receive the sidelink data from the first UE through the PSSCH on the identified resource.

Meanwhile, in the UE autonomous resource selection mode (or mode 2), the UE autonomously determines a slot in which the SA is transmitted within the resource pool through sensing and a resource block that is a frequency axis resource used for transmission of the SA within the slot in which the SA is transmitted may be autonomously determined by the UE within the resource pool. Therefore, dissimilar to the BS resource scheduling mode (or mode 1), in the UE autonomous resource selection mode (or mode 2), the UE autonomously determines a resource without separately receiving signaling fields related to resource scheduling included and thereby indicated in the DCI.

Also, in the UE autonomous resource selection mode (or mode 2), the contents related to the SCI included in the SA as information required for the UE to transmit data in V2X communication is autonomously determined by the UE. Therefore, dissimilar to the BS resource scheduling mode (or mode 1), in the UE autonomous resource selection mode (or mode 2), the UE performs autonomous determination without separately receiving signaling fields related to the SCI included and thereby indicated in the DCI.

Here, the first UE may autonomously determine sidelink scheduling information and may generate the determined sidelink scheduling information as first SCI and second SCI. The first UE may transmit the first SCI to the second UE through the PSCCH and may transmit the second SCI to the second UE through a portion of available PSSCH transmission resources. The second UE may identify a sidelink resource through which the first UE is to transmit sidelink data through the PSSCH based on the first and second SCI received from the first UE. The second UE may receive the sidelink data from the first UE through the PSSCH on the identified resource.

That is, there is a difference in that the SCI included in the SA as information required for the UE to transmit data is scheduled by the BS in the BS resource scheduling mode (or mode 1) and autonomously selected by the UE in the UE autonomous resource selection mode (or mode 2). However, in both of the BS resource scheduling mode (or mode 1) and the UE autonomous resource selection mode (or mode 2), the SCI included in the SA is required for a data receiving UE (the receiving UE or the second UE) recto decode data transmitted from a data transmitting UE (the transmitting UE or the first UE). Therefore, the data transmitting UE (or the first UE) needs to transmit the SA including the SCI to the data transmitting UE (or the second UE).

As described above, configuration of the pool resource in V2X, particularly, for V-UE is described above with reference to FIGS. 7 and 8 and a sensing-based resource selection method is described above with reference to FIG. 9.

Dissimilar to vehicle-to-vehicle (V2V) that considers V-UE, additional energy saving may be considered in vehicle-to-pedestrian (V2P) that is transmitted from V-UE to pedestrian-user equipment (P-UE) or pedestrian-to-vehicle (P2V) that is transmitted from P-UE to V-UE. That is, although the V-UE may not consider a power limitation situation as the UE that is included in the vehicle, the P-UE is a UE of a pedestrian with limited battery power and thus, needs to consider the power limitation situation.

Therefore, as illustrated in FIG. 8, for V-UE, a sensing-based resource selection method (hereinafter, a full sensing method) may be applied to all of resources within a specific duration (e.g., 1000 ms corresponding to a duration from "TTI m-a" to "TTI m-b"). Meanwhile, for P-UE, a sensing-based resource selection method (hereinafter, a partial sensing method) is required with respect to some resources within a specific duration (e.g., 1000 ms corresponding to the duration from "TTI m-a" to "TTI m-b") to save power consumption.

A case in which the P-UE transmits sidelink control information and data to the V-UE (corresponding to a case in which V2P communication is performed and a case in which the V-UE, such as a vehicle, acquires information about the P-UE, such as a pedestrian, and prepares for safety matters) may be considered. On the contrary, a case in which the P-UE does not receive the sidelink control information and the data from the V-UE (corresponding to a case in which V2P communication is not performed and a case in which the V-UE, such as a vehicle, does not need to acquire information about the P-UE, such as a pedestrian, and to prepare for safety matters) may be considered. In the case of considering a case of supporting devices lacking such sidelink reception capabilities, a random-based resource selection method (hereinafter, a random resource selection method) is also required for the P-UE.

That is, the full sensing method as in the example of FIG. 8 may be applied to the resource selection method for the V-UE and the resource pool may be configured as in the examples of FIGS. 7 and 8.

Although the resource selection method for the P-UE that considers power limitations may require the partial sensing method, a detailed operation related thereto is not defined so far. Also, a detailed configuration method is not defined so far with respect to the resource pool for the P-UE that considers power limitations.

Also, although the random resource selection method may need to be applied to the resource selection method for the P-UE lacking the sidelink reception capability, a detailed operation related thereto is not defined so far. Also, a detailed configuration method is not defined so far with respect to the resource pool for the P-UE that lacks the sidelink reception capability.

The partial sensing-based resource pool for P-UE (particularly, a slot pool corresponding to a time domain resource) may be defined based on the full sensing-based resource pool for V-UE (particularly, the slot pool corresponding to the time domain resource) as in the examples of FIGS. 7 and 8. That is, the full sensing method and the partial sensing method may simply differ in terms of a sensing window size and may perform a similar sensing-based operation, which may lead to simplifying complexity.

Meanwhile, the random resource selection-based resource pool for P-UE (particularly, the slot pool corresponding to the time domain resource) may be independently defined from the full sensing-based resource pool for V-UE (particularly, the slot pool corresponding to the time domain resource) as in the examples of FIGS. 7 and 8. When the resource pool for P-UE (particularly, the slot pool corresponding to the time domain resource) is independently configured, the performance of the P-UE may be improved compared to sharing the resource pool (particularly, the slot pool corresponding to the time domain resource). That is, since a random resource selection-based resource for P-UE is independently configured without being affected by other resources (e.g., a partial sensing-based resource for P-UE and/or a full sensing-based resource for V-UE), the performance of the P-UE may be improved.

On the other hand, the random resource selection-based resource pool for P-UE (particularly, the slot pool corresponding to the time domain resource) may be defined by sharing the full sensing based-resource pool for V-UE (particularly, the slot pool corresponding to the time domain resource) as in the examples of FIGS. 7 and 8. This is to prevent a decrease in resources available for V2V when configuring an independent resource for the P-UE, thereby affecting the performance of V2V. Also, since a single pool is used through sharing, it is possible to more efficiently use resources without wasting resources.

Here, the random resource selection-based resource pool for P-UE (particularly, the slot pool corresponding to the time domain resource) and the partial sensing based-resource pool for P-UE (particularly, the slot pool corresponding to the time domain resource) may be distinguished from each other with mutual orthogonality. This is to ensure that resources used by partial sensing-based P-UEs do not interfere with random resource selection-based P-UEs.

Hereinafter, prior to describing a method of configuring the partial sensing-based resource selection method and resource pool for P-UE (particularly, the slot pool corresponding to the time domain resource), a configuration of the full sensing-based V-UE resource selection and resource pool is initially described.

Figure 11:
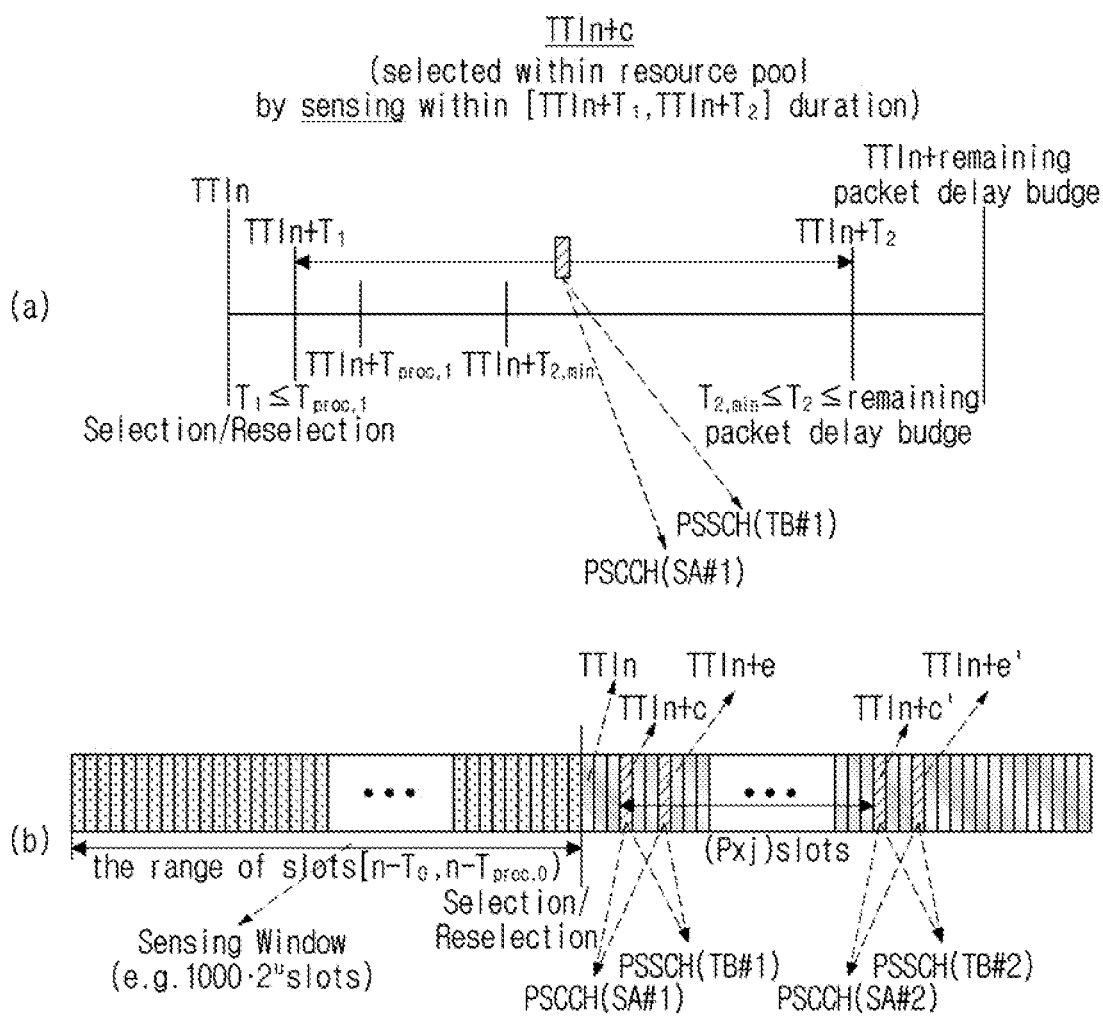
FIG. 11 illustrates a full sensing-based resource selection and resource pool configuration to which the present disclosure may apply.

FIG. 11 illustrates a full sensing-based resource selection and resource pool configuration to which the present disclosure may apply.

Referring to FIG. 11, sensing may be performed for slots that belong to the range of $[n-T_0, n-T_{proc,0}]$. Here, $T_0$ and $n-T_{proc,0}$ may be the same as described above with reference to FIG. 9. For example, as described above, if $a=T_0=1000\cdot 2^u$ (slots) and $b=T_{proc,0}=1$, the UE may perform sensing in a sensing window corresponding to $1000\cdot 2^u$ slots. Through this, the UE may verify a resource that is occupied and used by another UE. The UE may select a specific resource from among remaining resources excluding the resource occupied and used by the other UE among resources that belong to a resource pool. For example, referring to (b) of FIG. 11, the UE may select TTI n+c, TTI n+e, TTI n+c', and TTI n+e', and may perform transmission of a control channel and a data channel on the selected resource. Here, TTI n+c and TTI n+c' may have a difference by P*j TTIs. For example, when a single TTI represents a single slot that is the aforementioned bitmap application target, the TTI may be P*j slots. Likewise, TTI n+e and TTI n+e' may have a difference by P*j TTIs (or P*j slots). Here, for example, P may denote a resource reservation interval.

In detail, for example, a value of P may be determined by upper layer signaling. Here, a value of P may be one of values corresponding to 0, 1, 2, . . . , 99, 100, 200, 300, . . . , 1000 ms. For example, a value of P at a transmission UE (Tx UE) may be indicated as $P_{rsvp\_TX}$ and a value of P at a reception UE (Rx UE) may be indicated as $P_{rsvp\_RX}$. Here, $P_{rsvp\_TX}$ and $P_{rsvp\_RX}$ may be values of ms unit. When the above $P_{rsvp\_TX}$ and $P_{rsvp\_RX}$ are converted to logical values of slot unit, they may be indicated as $P'_{rsvp\_TX}$ and $P'_{rsvp\_RX}$, respectively.

Here, j may be one of values selected through carrier or band-specific network configuration or pre-configuration used for V2X within the range of $[0, 1, \ldots, 10]$. Here, j may be selected and indicated through a signaling field "Resource reservation" of SCI included in SA, but is not limited to the aforementioned example. Here, if j=0, it may indicate that a value of c' is absent. That is, it may indicate that no resource is reserved after "P*j" TTIs from "TTI n+c" for transmission of TB #2 (second TB).

Here, referring to FIG. 11, a slot pool configuration corresponding to a time axis resource after TTI n may be the same as FIG. 7. Here, referring to (a) of FIG. 11, when full sensing is performed, duration "TTI n+c" may be selected by sensing from a resource pool included in [TTI $n+T_1$, TTI $n+T_2$].

Here, $n \leq n+T_1 \leq n+T_{proc,1}$. Also, $n+T_{2,min} \leq n+T_2 \leq n+$(remaining packet delay budget). That is, using $T_1 \leq T_{proc,1}$ and $T_{2,min} \leq T_2 \leq$(remaining packet delay budget), values of $T_1$ and $T_2$ may be determined.

For example, if u=0 (i.e., if SCS=15 kHz), it may be fixed to a value corresponding to $T_{proc,1}=3$ slots. Also, if u=1, 2, and 3 (i.e., if SCS=each of 30 kHz, 60 kHz, and 120 kHz), $T_{proc,1}$ may be fixed to values corresponding to 5 slots, 9 slots, and 17 slots. Also, $T_{2,min}$ may be pre-configured as a value corresponding to $5 \cdot 2^u$, $10 \cdot 2^u$, or $20 \cdot 2^u$ slots.

Figure 12:
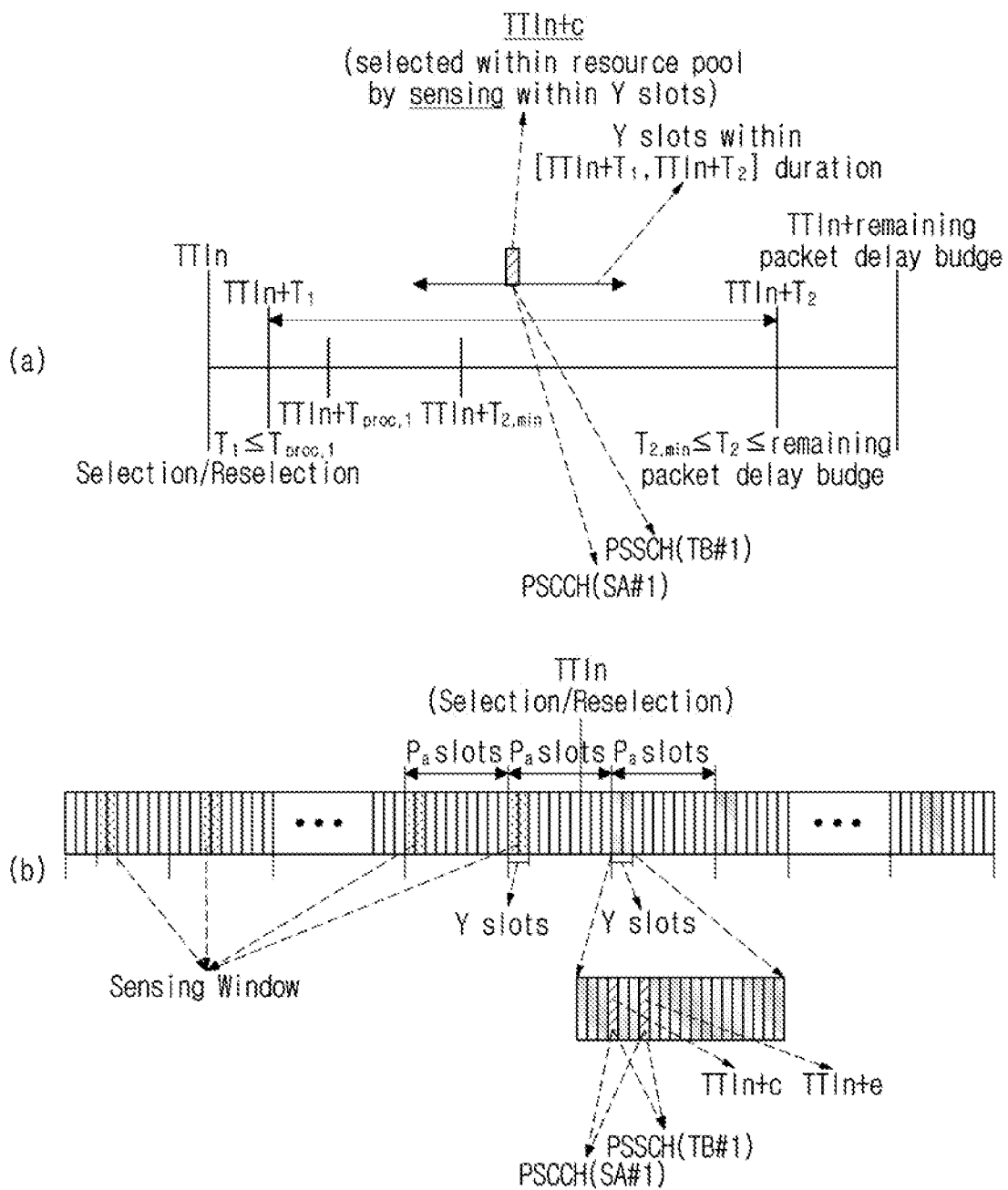
FIG. 12 illustrates a partial sensing-based resource selection and resource pool configuration to which the present disclosure may apply.

FIG. 12 illustrates a partial sensing-based resource selection and resource pool configuration to which the present disclosure may apply.

Referring to (a) of FIG. 12, when the UE performs partial sensing, "TTI n+c" may be selected by sensing from a resource pool that belongs to a resource area corresponding to Y slots. Here, Y slots may be selected within duration [TTI n+$T_1$, TTI n+$T_2$].

That is, full sensing may select a data transmission resource from a resource pool included in the duration [TTI n+$T_1$, TTI n+$T_2$] and partial sensing may select a data transmission resource from a resource pool included in Y slots within the duration [TTI n+$T_1$, TTI n+$T_2$]. Therefore, when the UE performs partial sensing, a selection area of the data transmission resource selected by the UE may decrease compared to full sensing.

Here, as described above, $n \leq n+T_1 \leq n+T_{proc,1}$ and $n+T_{2,min} \leq n+T_2 \leq n+$(remaining packet delay budget. That is, using $T_1 \leq T_{proc,1}$ and $T_{2,min} \leq T_2 \leq$ (remaining packet delay budget, values of $T_1$ and $T_2$ may be determined. Also, as described above, if u=0 (i.e., if SCS=15 kHz), it may be fixed to a value corresponding to $T_{proc,1}$=3 slots. Also, if u=1, 2, and 3 (i.e., if SCS=each of 30 kHz, 60 kHz, and 120 kHz), $T_{proc,1}$ may be fixed to values corresponding to 5 slots, 9 slots, and 17 slots. Also, $T_{2,min}$ may be pre-configured as a value corresponding to $5 \cdot 2^u$, $10 \cdot 2^u$, or $20 \cdot 2^u$ slots.

Here, for arbitrary slot y that belongs to duration Y, slots corresponding to y-k·Pa may belong to a sensing window. The UE may perform partial sensing only for the aforementioned slots. Here, k may correspond to a case in which a bit value (a bit value of a $k^{th}$ bit) of a bit corresponding to each k value in a bitmap having a length int($T_0$/k) indicated through upper layer signaling among 1, 2, . . . , int($T_0$/Pa). Also, int($T_0$/$P_a$) may be an integer value acquired when dividing $T_0$ by $P_a$. For example, if $T_0$=1000 ms (=1000·$2^u$ slots) and $P_a$=100 ms (=100·$2^u$ slots), k may be selected from among 1, 2, . . . , 10. Here, if a 10-bit-bitmap indicated by upper layer signaling is "1100100101", bit values of $1^{st}$ bit, $2^{nd}$ bit, $5^{th}$ bit, $8^{th}$ bit, and $10^{th}$ bit are 1 in the corresponding bitmap and thus, k=1, 2, 5, 8, and 10.

Therefore, the UE may verify a resource that is occupied and used by another UE through sensing in the sensing window. The UE may select a resource from among remaining resources excluding the resource occupied and used by the other UE among resources that belong to a resource pool. That is, referring to (b) of FIG. 12, as described above, the UE may perform sensing in the sensing window and may select TTI n+c and TTI n+e from among resources not occupied and not used by another UE and may perform a data transmission. Also, for example, as described above with reference to FIG. 9, in the case of supporting a configuration of TTI n+c' and TTI n+e', the UE may select resources of TTI n+c' and TTI n+e' and may perform transmission of a control channel and a data channel on the selected resources.

Also, for example, parameter values related to FIG. 12 may be arranged as follows:

$T_o$: $T_o$ slots correspond to slots that belong to a duration from "TTI m–a" to "TTI m–b" in full sensing. For example, as described above, if a=$T_o$=1000·$2^u$(slots) and b=$T_{proc,0}$=1, $T_o$ may be a value corresponding to 1000·$2^u$ slots.

Y: Y may be a partial sensing unit duration. As described above with reference to FIG. 12, Y may be configured with some slots within a partial duration corresponding to [TTI m+$T_1$, TTI m+$T_2$]. Here, $T_1 \leq T_{proc,1}$ and $T_{2,min} \leq T_2 \leq$ (remaining packet delay budget).

Also, for example, a method of selecting, by the UE, a resource for a control channel and data channel transmission based on partial sensing in an existing communication system (e.g., LTE) is described. For example, as described above, the UE may select arbitrary slot y from a resource pool that belongs to a resource area corresponding to Y slots. For example, a configuration of selecting Y slots and slot y from among the Y slots may be the same as FIG. 12. That is, in FIG. 12, Y slots may be determined as resources for control channel and data channel transmission and arbitrary slot y may be selected from among the Y slots. Then, the UE may perform monitoring for all the slots corresponding to y–k*P with respect to the selected slot y. Here, P may be $P_a$ of FIG. 12 and, as described above, k may be indicated based on upper layer signaling. That is, the UE may configure a sensing window that needs to be sensed based on the slot y among the determined Y slots, based on y–k*P.

The UE may set a threshold for resource exclusion. That is, the UE may set a threshold for determining whether to exclude a resource used by another UE. The UE may set a set of single slot resource candidates $S_A$ and a resource set $S_B$. Here, a single slot resource candidate may be Rx,y. For example, y may be the aforementioned slot y and x may correspond to a frequency axis resource in the slot y. Also, for example, $S_A$ may indicate a set of all the possible single slot resource candidates.

Then, the UE may exclude slots that meet a specific condition for all the possible y values in the resource pool that belongs to the resource area corresponding to the Y slots. Here, the UE may determine the slots that meet the specific condition as slots that are being used by another UE and may exclude the corresponding slots.

In detail, the UE may receive sidelink control information (SCI) in each slot. Here, the UE may verify a plurality of SCI exceeding a threshold among the plurality of received SCI. For example, a resource reservation field and a priority field may be present in SCI received by the UE. Here, the resource reservation field and the priority field may indicate $P_{rsvp}$ RX and $prio_{RX}$. Also, for example, although the resource reservation field and the priority field are present in SCI, the UE may not consider SCI that does not exceed the threshold. That is, the UE may verify the resource reservation field and the priority field in the SCI for the plurality of SCI exceeding the threshold among the plurality of received SCI.

In detail, if the UE receives SCI in a slot m, the UE may determine whether a PSSCH-RSRP measurement value corresponding to the received SCI exceeds $Th_{prioTX,prioRX}$. Here, if the SCI received in the slot m exceeds the threshold, the UE may verify resources periodically reserved for transmission in the slot m and from the slot m based on the SCI received in the slot m. That is, the UE may determine the resources periodically reserved for transmission in the slot m and from the slot m as resources being used by another UE and may exclude the corresponding resources. Here, the aforementioned resource needs to be excluded from among resources used by the UE. Therefore, the UE may verify whether the resources periodically reserved for transmission in the slot m and from the slot m and resources periodically reservable for transmission in slot y and from the slot y overlap. Here, when the resource overlaps, the UE may exclude the corresponding resource. Here, the slot m may be $t^{SL}_m$ and the resources periodically reserved for transmission from the slot m may be $t^{SL}_{m+qxPstepxPrsvp\_RX}$. Also, the resources periodically reservable for transmission in the slot y and from the slot y may be $R_{x,y+jxP'rsvp\_TX}$ and such resources may be compared.

That is, the UE may exclude y for which another UE reserved a resource based on the plurality of SCI exceeding the threshold in the resource pool that belongs to the resource area corresponding to Y slots.

Here, as described above, the UE may perform monitoring on remaining slots that exclude an excluded slot and may verify the number of single slot resource candidates that belong to $S_A$. Here, if a number of single slot resource candidates is less than $0.2M_{total}$, the UE may increase the threshold by 3 dB and then perform monitoring again. Here, $M_{total}$ denotes a total number of single slot resource candidates. That is, the UE may receive SCI, may compare the received SCI to the threshold increased by 3 dB, and may exclude y for which another UE reserved a resource based on the plurality of SCI exceeding the threshold.

Also, as described above, the UE may average monitoring values for all slots corresponding to "y−k*P" with respect to single slot resource candidates remaining in SA and may acquire Ex,y. Here, the UE may move Ex,y values to SB in ascending order. For example, the UE may move the Ex,y values until the number of single slot resource candidates belonging to $S_B$ reaches $0.2M_{total}$.

Then, the UE may report $S_B$ to an upper layer. Here, a resource used by each UE for V2X data transmission may be determined based on the aforementioned report value. For example, as described above, when a V2X communication is performed based on a BS scheduling mode (mode 1), the base station may determine a resource based on the reported $S_B$ information and may indicate the same to the UE.

Also, for example, a method of selecting, by the UE, a resource for control channel and data channel transmission based on full sensing in a new communication system (e.g., NR) is described.

For example, the UE may define the single slot resource candidate (a candidate single-subframe resource) Rx,y within the time duration [n+T$_1$, n+T$_2$]. Here, for example, a method of setting T$_1$ and T$_2$ may be the same as described above. In detail, as described above, T$_1$ and T$_2$ may be set to pre-configured values or fixed values based on Table 9. That is, the UE may define a selection window and may define the single slot resource candidate Rx,y. Here, in the case of partial sensing, Y slots may be the selection window. In the case of full sensing, the time duration [n+T$_1$, n+T$_2$] may be defined as the selection window.

Also, for the sensing window to be monitored, the UE may define a slot that belongs to the range of [n−T$_0$, n−T$_{proc,0}$]. Here, a method of setting T$_0$ and T$_{proc,0}$ may be the same as described above. In detail, T$_0$ and T$_{proc,0}$ may be set to pre-configured values or fixed values based on Table 9. Here, in the case of partial sensing, the sensing window may be configured based on Y slots. In the case of full sensing, slots that belong to the range of [n−T$_0$, n−T$_{proc,0}$] may be selected and a different sensing window may be configured.

That is, sizes of the selection window and the sensing window in the case of full sensing may be greater than sizes of the selection window and the sensing window in the case of partial sensing.

Also, for example, as described above, when the UE performs full sensing, the UE may determine a threshold to be used for resource exclusion. Then, the UE may verify a set SA of single slot resource candidates. Here, SA may be a set of all the possible single slot resource candidates. For example, as described above, the single slot resource candidate (candidate single-subframe resource) may be represented as Rx,y and y may correspond to the aforementioned slot y and x may correspond to a frequency axis resource in the slot y. Then, the UE may exclude slots that meet a specific condition for all the possible Y values in the resource pool that belongs to the time duration [n+T$_1$, n+T$_2$]. That is, the UE may perform monitoring for all the possible Y values in the resource pool that belongs to the time duration [n+T$_1$, n+T$_2$] and may exclude a resource that may be used by another UE.

Here, for example, unless the UE performs monitoring in the slot m (i.e., if sensing is skipped), the UE may exclude transmission resources of potential data having a period $P_{rsvp\_TX}$ that may overlap reception of data having a period $P_{rsvp\_RX}$ from the slot m. In detail, when the UE is performing a data transmission in the slot m within the sensing window, the UE may not perform monitoring in the slot m. That is, the UE may not perform sensing in the slot m. Since a resource use status for resources based on the slot m may be uncertain, the UE may exclude transmission resources of potential data having the period $P_{rsvp\_TX}$ that may overlap reception of data having the period $P_{rsvp\_RX}$ from the slot m. Here, for example, in the case of partial sensing, since the sensing window may be configured as a specific duration, the aforementioned operation may be unnecessary. For example, the sensing window may be configured by excluding in advance a resource in which the UE is performing data transmission. Through this, aforementioned issue may not occur.

Then, when the UE excludes slots that meet the specific condition for all the possible y values in the resource pool that belongs to the time duration [n+T$_1$, n+T$_2$], the UE may verify SCI exceeding the threshold among the plurality of received SCI.

In detail, the UE may receive SCI in each slot. Here, the UE may verify the plurality of SCI exceeding the threshold among the plurality of received SCI. For example, the resource reservation field and the priority field in the SCI received by the UE may indicate $P_{rsvp\_RX}$ and prio$_{RX}$ values. Here, when the UE receives SCI in the slot m, the UE may determine whether a PSSCH-RSRP measurement value corresponding to the received SCI exceeds a threshold Th(prio$_{RX}$). That is, the UE may verify whether the corresponding slot m is used by another UE. The UE may verify whether resources periodically reserved for transmission from the slot m based on the SCI received in the slot m and resources periodically reservable for transmission in the slot y and from the slot y overlap. Here, when the resource overlaps, the UE may exclude the corresponding resource. Here, the slot m may be represented as $t^{SL}_{m+qxP'rsvp\_RX}$, and the resources periodically reservable for transmission in the slot y and from the slot y may be represented as $R_{x,y+jxP'rsvp\_TX}$. Such resources may be compared.

That is, the UE may exclude y for which another UE reserved a resource among all the possible y values in the resource pool that belongs to the time duration [n+T$_1$, n+T$_2$] based on the plurality of SCI exceeding the threshold. That is, the UE may exclude transmission resources of potential data having the period $P_{rsvp\_TX}$ that may overlap reception of data having the period $P_{rsvp\_RX}$ from the slot m. Then, the UE may determine whether the number of single slot resource candidates remaining in SA after resource exclusion is less than $X \cdot M_{total}$. Here, if the number of single slot resource candidates that belong to SA is less than $X \cdot M_{total}$, the UE may increase the threshold by 3 dB and may perform resource exclusion for all the possible Y values in the resource pool that belongs to the time duration [n+T$_1$, n+T$_2$].

Here, $M_{total}$ denotes the number of all the single slot resource candidates. Also, for example, it may be set by upper layer signaling as one of X=0.2, 0.35, and 0.5. Then, the UE may report $S_A$ to the upper layer. Here, a resource used by each UE for V2X data transmission may be determined based on the aforementioned report value. For example, as described above, when V2X communication is performed based on a BS scheduling mode (mode 1), the base station may determine the resource based on the reported $S_A$ information and may indicate the same to the UE.

That is, as described above, partial sensing of the existing communication system (e.g., LTE) and full sensing of the new communication system (e.g., NR) may be considered. Here, for example, resource reservation periods of full sensing and partial sensing in the existing communication system (e.g., LTE) and full sensing in the new communication system (e.g., NR) may be represented as the following Table 10 to Table 12.

TABLE 10

Full sensing of existing system (LTE full sensing)

Prsvp_TX: 20 ms, 50 ms, 100 ms, 200 ms, . . . , 900 ms
Prsvp_RX: 20 ms, 50 ms, 100 ms, 200 ms, . . . , 900 ms

TABLE 11

Partial sensing of existing system (LTE partial sensing)

Prsvp_TX: 100 ms, 200 ms, . . . , 900 ms
Prsvp_RX: 20 ms, 50 ms, 100 ms, 200 ms, . . . , 900 ms

TABLE 12

Full sensing of new system (NR full sensing)

Prsvp_TX: 0 ms, 1 ms, 2 ms, . . . , 99 ms, 100 ms, 200 ms, . . . , 900 ms
Prsvp_RX: 0 ms, 1 ms, 2 ms, . . . , 99 ms, 100 ms, 200 ms, . . . , 900 ms Here, or example, partial sensing in the new communication system may need to be configured based on full sensing in the new communication system, which is described below.

In detail, comparing the aforementioned partial sensing of the existing system (LTE partial sensing) and full sensing of the existing system (LTE full sensing), 20 ms and 50 ms may be excluded from $P_{rsvp\_TX}$ of partial sensing of the existing system (LTE partial sensing). Also, for example, in full sensing of the new communication system (NR full sensing), $P_{rsvp\_TX}$ and $P_{rsvp\_RX}$ may be all configured from 1 ms to 100 ms in units of 1 ms and may be the same as full sensing of the existing system (LTE full sensing) after 100 ms. Here, for example, FIG. 13 illustrates an example of a partial sensing-based resource selection method to which the present disclosure may apply.

As described above, (a) of FIG. 13 represents a case in which the UE performs partial sensing of the existing system (hereinafter, referred to as LTE partial sensing) and may consider a case in which $P_{rsvp\_TX}$ is a multiple of 100 ms. That is, the resource reservation period may not support 20 ms and 50 ms.

Here, when $P_{rsvp\_RX}$ supports 20 ms, 50 ms, and 100 ms, the corresponding resource reservation period may be a multiple of 100 ms or may be a value divided over 100 ms. That is, 100 ms may be a multiple of 20 ms or 50 ms. Therefore, in the case of performing partial sensing based on y−k*P, although a partial sensing interval is set to 100 ms (e.g., y, y−100, y−200, y−300, . . . (=y−100k)), the UE may perform partial sensing in consideration of all effect of data transmitted from another UE for all $P_{rsvp\_RX}$ cases.

Figure 13:
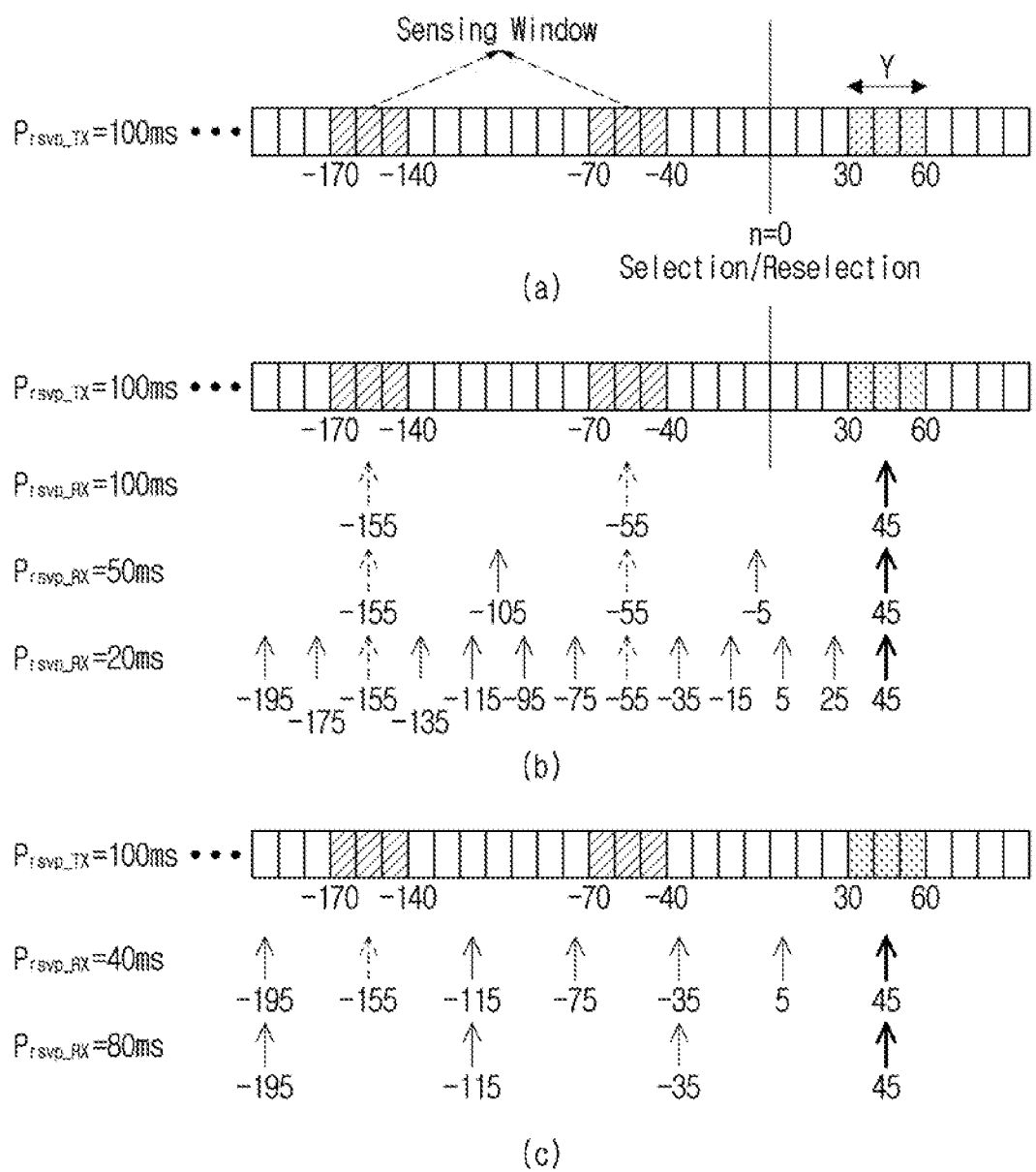
FIG. 13 illustrates an example of a partial sensing-based resource selection method to which the present disclosure may apply.

For example, referring to (b) of FIG. 13, if the partial sensing interval is 100 ms, $P_{rsvp\_RX}$ may be all included in a sensing duration and the UE may perform partial sensing in consideration of data transmitted from another UE. That is, although $P_{rsvp\_RX}$ is 20 ms or 50 ms, every periodic data transmission of 20 ms or 50 ms overlaps 100 ms that is the transmission resource reservation period ($P_{rsvp\_TX}$) of the UE and the effect thereof may be verified through partial sensing.

On the contrary, for example, referring to (c) of FIG. 13, in the new communication system, some of $P_{rsvp\_RX}$ values may not be divisible by $P_{rsvp\_TX}$. For example, a data transmission of another UE in every period $P_{rsvp\_RX}$ may not overlap a partial sensing duration corresponding to y−$P_{rsvp\_TX}$·k at all times. Therefore, although the UE performs partial sensing, the UE may not verify data transmitted from the other UE and sensing may not be efficiently performed accordingly. For example, in detail, referring to (c) of FIG. 13, if $P_{rsvp\_TX}$=100 ms and $P_{rsvp\_RX}$=40 ms or 80 ms, the UE may perform partial sensing for y−100*k. In this case, data transmission of another UE having $P_{rsvp\_RX}$=40 ms or 80 ms may not be accurately applied. That is, in (b) of FIG. 13, if $P_{rsvp}$ RX is 100 ms, 50 ms, or 20 ms that is a divisor of 100 ms, the UE may verify all the data transmission according to $P_{rsvp\_RX}$ in every sensing window and the above issue may not occur.

On the contrary, in (c) of FIG. 13, if $P_{rsvp\_RX}$ the NR is not a divisor of 100 ms, the UE may verify only a portion of data transmission according to $P_{rsvp\_RX}$ in the sensing window and may not verify all the data transmission. Also, if $P_{rsvp\_RX}$=40 ms, the UE may verify the data transmission only in a partial sensing duration. If $P_{rsvp\_RX}$=80 ms, the UE may not verify all the transmission. That is, although the other UE is actually occupying a resource, data transmission of the other UE may not be verified through partial sensing.

Considering this, if $P_{rsvp\_RX}$ is not a divisor Of $P_{rsvp\_TX}$ as in (c) of FIG. 13 in the new communication system (e.g., NR system), it may cause serious performance degradation in partial sensing. Considering this, a method of efficiently performing sensing in the new communication system (e.g., NR system) may be required and description related thereto is made below.

Here, for example, in the case of performing partial sensing in the new communication system (NR partial sensing, hereinafter, referred to as partial sensing), a method of limiting a resource reservation period in a network may be considered in consideration of the above issues. Here, for example, partial sensing may be performed in the same manner as partial sensing in the existing system. That is, a partial sensing interval may be set based on $P_{rsvp\_TX}$ and a data reception period recognizable through partial sensing may not be considered. For example, an operation may be performed as described above in consideration of a backward compatibility with the existing system. Here, for example, a performance degradation may occur and application may be performed according to a transmission situation.

As another example, $P_{rsvp\_RX}$ may be limited to a divisor value of $P_{rsvp\_TX}$ in the network. That is, when partial sensing is performed as described above, a $P_{rsvp\_RX}$ value for the data reception period in the network may be limited such that the UE may sense the data reception period based on the resource reservation period. In detail, for example, $P_{rsvp\_RX}$ may be limited to a divisor value of $P_{rsvp\_TX}$.

Also, for example, in the case of determining a partial sensing interval, the partial sensing interval may be determined in consideration of $P_{rsvp\_RX}$ as well as $P_{rsvp\_TX}$. That is, the partial sensing interval may be variously set.

In detail, based on the aforementioned description, a periodicity value may be set as an arbitrary value through upper layer signaling based on an upper layer parameter "sl-ResourceReservePeriodList" ("any periodicity value allowed by the upper layer parameter sl-ResourceReservePeriodList", hereinafter, a higher-layer-allowed periodicity value).

In relation to the higher-layer-allowed periodicity value, $P_{rsvp\_TX}$ and $P_{rsvp\_RX}$ may be configured in the new communication system by referring to Table 12. Values of Table 12 may be candidate values of $P_{rsvp\_TX}$ and $P_{rsvp\_RX}$. That is, some of values of Table 12 may be indicated to the UE as the higher-layer-allowed periodicity values. For example, the higher-layer-allowed periodicity value may be indicated to the UE based on a 4-bit value. Considering this, the higher-layer-allowed periodicity value may be configured and provided with 16 values among the values of Table 12, but is not limited thereto. Then, the UE may determine a period to be used for actual data transmission based on the higher-layer-allowed periodicity value and may transmit the determined period to a UE that receives data through SCI. That is, a resource reservation period between V2X UEs may be determined based on the aforementioned description.

Also, for example, in the case of determining a partial sensing interval, a partial sensing interval for divisor or multiple values of $P_{rsvp\_TX}$ among higher-layer-allowed periodicity values may be determined as $P_{rsvp\_TX}$. Here, a partial sensing duration may be y–$P_{rsvp\_TX}$·k.

For example, for resource reservation periods 100 ms, 50 ms, and 20 ms supported in FIG. 13, if $P_{rsvp\_TX}$=100 ms, the partial sensing duration for 20 ms and 50 ms that are divisors of 100 ms may be determined as y–100·k.

On the contrary, for values aside from a divisor or a multiple of $P_{rsvp\_TX}$ among the higher-layer-allowed periodicity values, an additional partial sensing interval may be need to be set. For example, a value of $P_{rsvp\_RX}$ may not be a divisor or a multiple of $P_{rsvp\_TX}$. Here, for the additional partial sensing interval, $P_{rsvp\_RX\_1}$ may be used Here, the sensing duration may be y–$P_{rsvp\_RX\_1}$·k. In detail, in FIG. 13, $P_{rsvp\_TX}$=100 ms and the additional partial sensing duration for $P_{rsvp\_RX\_1}$=40 ms among periodicity values supported may be set as y–40·k.

As another example, for values aside from a divisor or a multiple of $P_{rsvp\_TX}$ and a divisor or a multiple of $P_{rsvp\_RX\_1}$ among the higher-layer-allowed periodicity values, still another additional partial sensing interval may be set. For example, $P_{rsvp\_RX\_2}$ may be set. Here, the additional partial sensing interval may be y–$P_{rsvp\_RX\_2}$·k.

In detail, in FIG. 13, for $P_{rsvp\_TX}$=100 ms and $P_{rsvp\_RX\_2}$=30 ms among the periodicity values, the additional partial sensing duration may be set as y–30·k. That is, in addition to $P_{rsvp\_RX\_1}$ based on a period of 40 ms, $P_{rsvp\_RX\_2}$=30 ms may be further set as the additional partial sensing duration. Here, wen another value rather than the divisor and the multiple is present, the additional partial sensing duration may be further configured, and the present disclosure is not limited to the aforementioned example.

For example, the partial sensing duration may be a sum of three durations y–100·k, y–40·k, and y–30·k. Therefore, when there is no limit on the resource reservation period for partial sensing and various periodicity values are allowed, the number of partial sensing durations may continuously increase.

As another example, considering this, the partial sensing interval may be limited to $P_{rsvp\_TX}$. That is, the partial sensing interval may be limited to a value according to $P_{rsvp\_TX}$ among the higher-layer-allowed periodicity values. Here, partial sensing may be performed only when satisfying partial sensing through the partial sensing interval using the value according to $P_{rsvp\_TX}$. Otherwise, partial sensing may be switched to full sensing.

In detail, for example, the higher-layer-allowed periodicity value may consider only a divisor or a multiple of $P_{rsvp\_TX}$ among values of 0 ms, 1 ms, 2 ms, . . . , 99 ms, 100 ms, 200 ms, . . . , 900 ms. Here, the partial sensing duration may be y–$P_{rsvp\_TX}$·k.

Here, in the case of satisfying the aforementioned partial sensing duration, partial sensing may be performed. That is, in a case in which the UE performs partial sensing based on the partial sensing interval that is set based on $P_{rsvp\_TX}$, the UE may perform partial sensing when only $P_{rsvp\_RX}$ having a divisor value or a multiple value of $P_{rsvp\_TX}$ is configured and accordingly, the UE is capable of performing all sensing in the partial sensing duration. On the contrary, when $P_{rsvp\_RX}$ having a value that is not a divisor value or a multiple value of $P_{rsvp\_TX}$ and accordingly, the UE is incapable of performing all sensing in the partial sensing duration, the UE may not satisfy the partial sensing duration and may perform full sensing. That is, when the resource reservation period is configured only with a divisor value or a multiple value of $P_{rsvp\_TX}$, the UE may perform partial sensing. On the contrary, a value that is not a divisor or a multiple of $P_{rsvp\_TX}$ is included, partial sensing may be switched to full sensing.

In detail, for example, if $P_{rsvp\_TX}$=100 ms, all of or some of {0 ms, 10 ms, 20 ms, 25 ms, 50 ms, 100 m, 200 ms, . . . , 900 ms} may be available as the higher-layer-allowed periodicity value. That is, when $P_{rsvp\_RX}$ is determined based on at least one of the aforementioned values, the UE may perform partial sensing based on the partial sensing interval. That is, in the case of performing sensing in consideration of only a combination of periodicity values having a divisor or multiple relationship therebetween among the higher-layer-allowed periodicity values, the UE may perform partial sensing. On the contrary, when values that are not in a divisor or multiple relationship among the higher-layer-allowed periodicity values are included, the UE may perform full sensing by switching to full sensing.

As another example, a partial sensing interval may be limited to a specific value. Here, when a resource reservation period value is limited to multiples of a specific value, the UE may perform partial sensing. On the contrary, when the resource reservation period value is not limited to the multiples of the specific value, the UE may perform full sensing. Here, the specific value may be 20 ms, but is not limited thereto. Here, the periodicity value may need to be set to 20 ms based on a physical value and a logical value of a period. For example, FIG. 14 illustrates an example of a case in which the partial sensing interval is set to 20 ms to which the present disclosure may apply.

Figure 14:
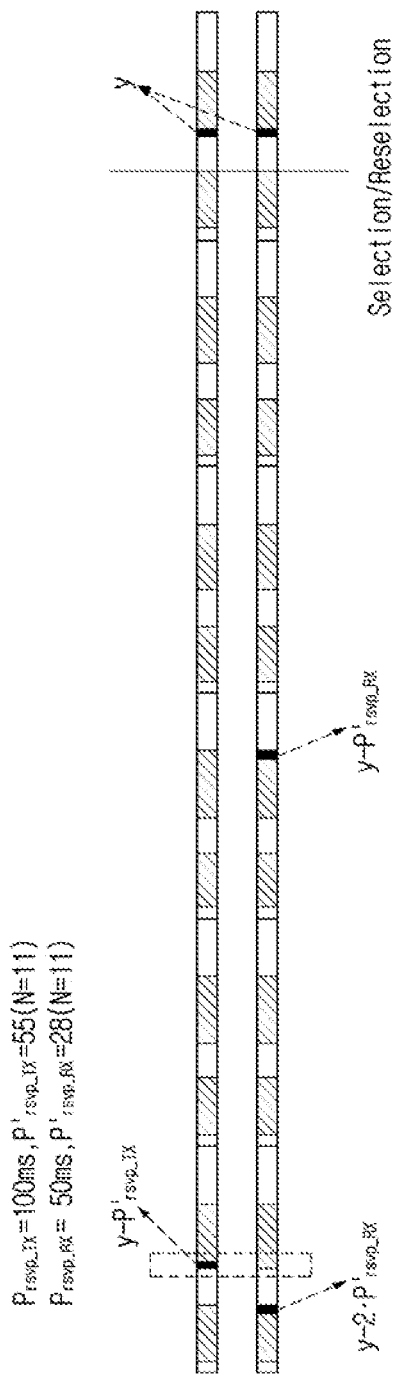
FIG. 14 illustrates an example of a case in which a partial sensing interval is set to 20 ms to which the present disclosure may apply.

Here, referring to FIG. 14, although $P_{rsvp\_TX}$ is a multiple of $P_{rsvp\_RX}$ and the UE performs partial sensing, a situation of being occupied by data transmitted at the period of $P_{rsvp\_RX}$ may not be verified in the case of considering the partial sensing interval $P_{rsvp\_TX}$. In detail, for example, in FIG. 14, $P_{rsvp\_TX}$=100 ms and $P_{rsvp\_RX}$=50 ms. Here, the partial sensing interval may be set based on $P_{rsvp\_TX}$. Here, when the UE performs partial sensing based on the partial sensing interval set as described above, the UE may not recognize the situation of being occupied by data transmitted at the period of $P_{rsvp\_RX}$. For example, a physical periodicity value of a unit of ms may be converted to $P'_{rsvp}$ that is a logical value based on the following Equation 3. For example, in the case of considering the partial sensing interval, an actual value to be applied may be the logical value $P'_{rsvp}$. In detail, for example, when the UE operates based on TDD, the partial sensing interval may be considered based on a slot that is actually used and may be named through $P'_{rsvp}$ that is the logical value. Therefore, the physical periodicity value in the unit of ms may be converted to $P'_{rsvp}$ that is the logical value based on the following Equation 3. Here, considering the following Equation 3, the physical periodicity value may be converted to the logical value due to a value of N within the unit of 20 ms.

For example, considering the following Equation 3, unless $P_{rsvp}$ is a multiple of 20 ms, an issue may occur when the periodicity value converts from the physical value to the logical value.

$$P'_{rsvp} = \left\lceil \frac{N}{20 \text{ ms}} \times P_{rsvp} \right\rceil \quad \text{[Equation 3]}$$

In detail, for example, the partial sensing duration in FIG. 14 may be configured based on the periodicity value that is converted to the logical value based on Equation 3. Here, $P_{rsvp\_TX}=100$ ms and $P_{rsvp\_RX}=50$ ms and a case in which a value of N=11 may be considered. Here, based on Equation 3, $P'_{rsvp\_TX}$ may be 55 and $P'_{rsvp\_RX}$ may be 28 ($\lceil 27.5 \rceil=28$). Referring to the aforementioned results, when partial sensing is performed based on the physical value, 100 ms and 50 ms may be in a divisor and multiple relationship and the partial sensing duration may be included accordingly. On the contrary, when partial sensing is performed based on the logical value, 55 and 28 may not be in the divisor and multiple relationship. Therefore, when performing partial sensing, a duration in which a sensing duration is omitted without overlapping may be present, which is illustrated in FIG. 14. That is, in FIG. 14, $y-P'_{rsvp\_TX}$ and $y-2P'_{rsvp\_RX}$ need to match for arbitrary y, but may not match in terms of logical value. Considering this, the partial sensing interval may be set to 20 ms. That is, the higher-layer-allowed periodicity value may be limited to a multiple value of 20 ms.

Therefore, the higher-layer-allowed periodicity value may be configured with at least one of values {0 ms, 20 ms, 40 ms, 60 ms, 80 ms, 100 ms, 200 ms, . . . , 900 ms}. If one of the aforementioned values is set as $P_{rsvp\_TX}$ (e.g., if $P_{rsvp\_TX}=100$ ms), the partial sensing duration may be represented as y−20*k (ms).

Here, if there is no missing portion when performing partial sensing based on the aforementioned partial sensing duration, the UE may perform partial sensing. On the contrary, if it is not a multiple of 20 ms and missing is likely to occur through partial sensing of the UE, the UE may perform full sensing by switching to full sensing. For example, here, for k={1, 2, . . . , int($T_o$/k)}, a duration in which a bit value of bitmap int($T_o$/k) corresponds to all values corresponding to 1 may be included.

Based on the aforementioned description, the following Table 13 to Table 15 may be possible combinations of $P_{rsvp\_TX}$ and $P_{rsvp\_RX}$. For example, comparing Table 13 and Table 14, 40 ms, 60 ms, and 80 ms of Table 14 are not divisors of $P_a=100$ and thus, may be omitted. Here, in Table 13 and Table 14, $P_a=100$ and $y-k\cdot P_a=y-k\cdot 100$. That is, they may be set to be the same as in the existing communication system. Also, for example, $P_a=20$ and $y-k\cdot P_a=y-k\cdot 20$, and the present disclosure is not limited to the aforementioned example.

Also, for example, as in Table 15, all of $P_{rsvp\_TX}$ and $P_{rsvp\_RX}$ may be set based on a unit of 20 ms. Here, for example, $P_a=20$ and $y-k\cdot P_a=y-k\cdot 20$, and the present disclosure is not limited to the aforementioned example.

Also, for example, the contents of Table 14 and Table 15 may be combined and configured as follows. the higher-layer-allowed periodicity value may be configured with at least one of values {0 ms, 20 ms, 40 ms, 60 ms, 80 ms, 100 ms, 200 ms, . . . , 900 ms}. Here, as shown in Table 14, if $P_{rsvp\_TX}$ is multiple of 100 ms and $P_{rsvp\_RX}=$at least one of {20 ms, 100 ms, 200 ms, . . . , 900 ms, 1000 ms}, P=100 may be set. Also, as shown in Table 15, if $P_{rsvp\_TX}$ is multiple of 20 ms and $P_{rsvp\_RX}=$at least one of {20 ms, 40 ms, 60 ms, 80 ms, 100 ms, 200 ms, . . . , 900 ms, 1000 ms}, $P_a=20$ may be set.

TABLE 13

$P_{rsvp\_TX}$ = one of {100 ms, 200 ms, . . . , 900 ms, 1000 ms}
$P_{rsvp\_RX}$ = at least one of {20 ms, 40 ms, 60 ms, 80 ms, 100 ms, 200 ms, . . . , 900 ms, 1000 ms}

TABLE 14

$P_{rsvp\_TX}$ = one of {100 ms, 200 ms, . . . , 900 ms, 1000 ms}
$P_{rsvp\_RX}$ = at least one of {20 ms, 100 ms, 200 ms, . . . , 900 ms, 1000 ms}

TABLE 15

$P_{rsvp\_TX}$ = one of {20 ms, 40 ms, 60 ms, 80 ms, 100 ms, 200 ms, . . . , 900 ms, 1000 ms}
$P_{rsvp\_RX}$ = at least one of {20 ms, 40 ms, 60 ms, 80 ms, 100 ms, 200 ms, . . . , 900 ms, 1000 ms}

Figure 15:
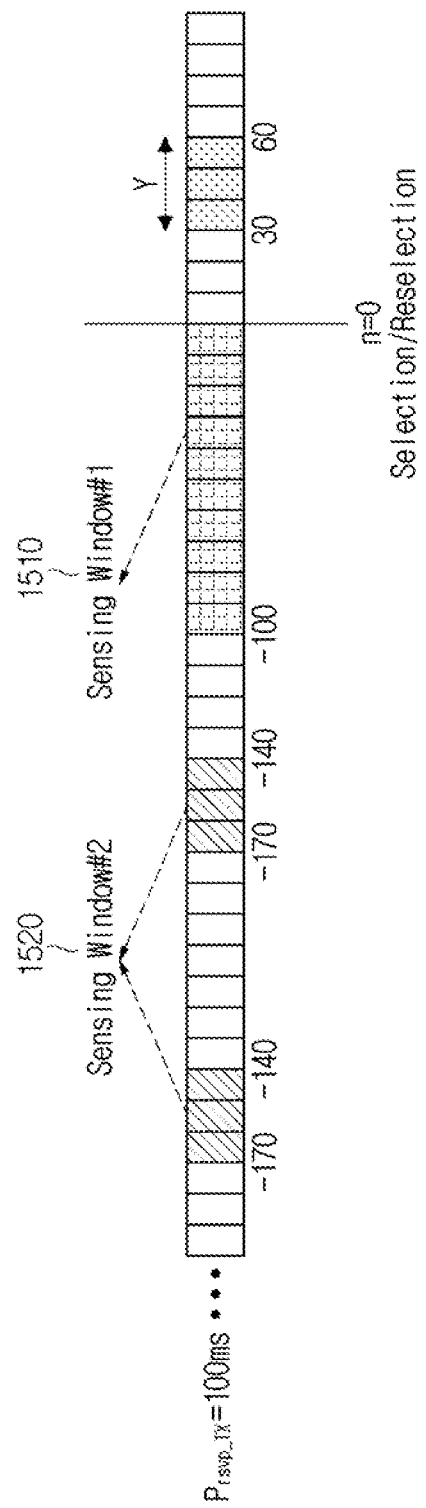
FIG. 15 illustrates an example of a case in which a sensing window is divided into two durations to which the present disclosure may apply.

FIG. 15 illustrates an example of a case in which a sensing window is divided into two durations to which the present disclosure may apply.

For example, in the case of limiting $P_{rsvp\_TX}$ that is the transmission resource reservation period of the UE, it may be a case limited by the UE and the UE may smoothly operate. Here, in the case of limiting even $P_{rsvp\_RX}$ that is the reception period of the UE, the resource reservation period needs to be limited even for a nearby UE (e.g., a vehicle) that transmits data to the corresponding UE. Considering this, the sensing window duration may be divided into two in FIG. 15.

In detail, referring to FIG. 15, the UE may perform sensing for all the slots in a sensing window duration 1 (1510). That is, the UE may perform sensing for all the slots, such as full sensing, in the sensing window duration 1 (1510) as a duration by n−100 ms. For example, based on Table 12, period candidate values in units of 1 ms or less may be set to $P_{rsvp\_TX}$ and $P_{rsvp\_RX}$ with respect to a period less than 100 ms. Here, for example, when the UE performs sensing for all the slots, such as full sensing, with respect to n−100 ms, the UE may exclude an overlapping resource based on an exclusion operation by $P_{rsvp\_RX} \leq 100$ ms.

For example, as described above, in the case of excluding slots that meet a specific condition for all the possible y values in a resource pool that belongs to n−100 ms, the UE may verify SCI that exceeds a threshold among a plurality of received SCI.

In detail, the UE may receive SCI in each slot. Here, the UE may verify a plurality of SCI exceeding the threshold among the plurality of received SCI. For example, a resource reservation field and a priority field within SCI received by the UE may indicate $P_{rsvp\_RX}$ and $prio_{RX}$. Here, when the UE receives SCI in the slot m, the UE may determine whether a PSSCH-RSRP measurement value corresponding to the received SCI exceeds a threshold Th(prio$_{RX}$). That is, the UE may verify whether the corresponding slot m is used by another UE. The UE may verify whether resources periodically reserved for transmission from the slot m based on SCI received in the slot m and resources periodically reservable for transmission in the slot y and from slot y overlap. Here, when the resource overlaps, the UE may exclude the corresponding resource. Here, the slot m may be represented as $t^{SL}_{m+qxP'rsvp\_RX}$ and the resources periodically reservable in the slot y and from the slot y may be represented as $R_{x,y+jxP'rsvp\_TX}$. Such resources may be compared.

That is, the UE may exclude y for which another UE reserved a resource among all the possible y values in a resource pool that belongs to a time duration n−100 ms based on the plurality of SCI exceeding the threshold. That is, the UE may exclude transmission resources of potential data having the period $P_{rsvp\_TX}$ that may overlap reception of data having the period $P_{rsvp\_RX}$ from the slot m.

Also, for example, the UE may perform sensing for y−k·P$_a$, such as partial sensing, in a sensing window duration 2 (1520). That is, the UE may perform sensing for y−k·P$_a$ that is a previous duration compared to n−100 ms. For example, after 100 ms, $P_{rsvp\_RX}$=200, 300, . . . , 900 ms and thus, sensing may be performed in consideration of the aforementioned periodicity value. Here, the UE may perform sensing for a duration corresponding to the following Equation 4. Here, k=1, 2, . . . . In detail, for example, y+j·P$_{rsvp\_TX}$ may be a duration in which the UE desires to perform transmission based on arbitrary value y. Here, j=0, 1, 2, . . . . Also, the partial sensing duration may be configured with values acquired by subtracting P$_{rsvp\_RX}$·k in the duration in which the UE desires to perform transmission. Here, k=1, 2, . . . . The duration in which the UE performs partial sensing based on the aforementioned description may be represented as Table 16 and Table 17.

$$\text{Partial sensing duration} = y + j \cdot P_{rsvp\_TX} - P_{rsvp\_RX} \cdot k \quad \text{[Equation 4]}$$

That is, in the case of considering $P_{rsvp\_RX} \le 100$ ms in addition to $P_{rsvp\_RX}$=200, 300, . . . , 900 ms, almost all the durations may be included as a partial sensing window, which is similar to full sensing of the UE. Considering this, the UE may perform resource exclusion in the sensing window duration 1 (1510) with respect to $P_{rsvp\_RX} \le 100$ ms and may perform resource exclusion through partial sensing with respect to $P_{rsvp\_RX} > 100$ ms. For example, in the existing communication system (e.g., LTE), if $P_{rsvp\_TX}$=100 and $P_{rsvp\_RX}$=200, 300, . . . , 900 ms, a duration in which partial sensing is performed may be represented as y−100·k. That is, the UE may perform partial sensing in y−100, y−200, y−300, . . . .

Here, for example, unless $P_{rsvp\_TX}$ is a divisor of $P_{rsvp\_RX}$, a partial sensing window may be configured for y−k·P$_a$. Here, P$_a$ may be a maximum common divisor of ($P_{rsvp\_TX}$, $P_{rsvp\_RX}$). In detail, for example, if $P^{rsvp\_TX}$=40 ms and $P_{rsvp\_RX}$=200, 300, . . . , 900 ms, P$_a$=20 ms for previous duration of n−100 ms. For example, the following Table 18 to Table 22 may represent the partial sensing duration with values acquired by subtracting P$_{rsvp\_RX}$·k based on y+j·P$_{rsvp\_TX}$ if P$_{rsvp\_TX}$=40 ms and P$_{rsvp\_RX}$=200, 300, . . . , 900 ms. Based on the following Table 18 to Table 22, the partial sensing duration may be set to y−120, y−140, y−160, y−180, and y−200.

TABLE 16

| | | k | | | | | |
|---|---|---|---|---|---|---|---|
| J · Prsvp_TX = 0 | | 0 | 1 | 2 | 3 | 4 | 5 |
| Prsvp_RX | 200 | 0 | −200 | −400 | −600 | −800 | |
| | 300 | 0 | −300 | −600 | −900 | | |
| | 400 | 0 | −400 | −800 | | | |
| | 500 | 0 | −500 | | | | |
| | 600 | 0 | −600 | | | | |
| | 700 | 0 | −700 | | | | |
| | 800 | 0 | −800 | | | | |
| | 900 | 0 | −900 | | | | |

TABLE 17

| | | k | | | | | |
|---|---|---|---|---|---|---|---|
| J · Prsvp_TX = 100 | | 0 | 1 | 2 | 3 | 4 | 5 |
| Prsvp_RX | 200 | 100 | −100 | −300 | −500 | −700 | −900 |
| | 300 | 100 | −200 | −500 | −800 | | |
| | 400 | 100 | −300 | −700 | | | |
| | 500 | 100 | −400 | −900 | | | |
| | 600 | 100 | −500 | | | | |
| | 700 | 100 | −600 | | | | |
| | 800 | 100 | −700 | | | | |
| | 900 | 100 | −800 | | | | |

TABLE 18

| | | k | | | | | |
|---|---|---|---|---|---|---|---|
| J · Prsvp_TX = 0 | | 0 | 1 | 2 | 3 | 4 | 5 |
| Prsvp_RX | 200 | 0 | −200 | −400 | −600 | −800 | −1000 |
| | 300 | 0 | −300 | −600 | −900 | | |
| | 400 | 0 | −400 | −800 | | | |
| | 500 | 0 | −500 | −1000 | | | |
| | 600 | 0 | −600 | | | | |
| | 700 | 0 | −700 | | | | |
| | 800 | 0 | −800 | | | | |
| | 900 | 0 | −900 | | | | |

TABLE 19

| | | k | | | | | |
|---|---|---|---|---|---|---|---|
| J · Prsvp_TX = 40 | | 0 | 1 | 2 | 3 | 4 | 5 |
| Prsvp_RX | 200 | 40 | −160 | −360 | −560 | −760 | −960 |
| | 300 | 40 | −260 | −560 | −860 | | |
| | 400 | 40 | −360 | −760 | | | |
| | 500 | 40 | −460 | −960 | | | |
| | 600 | 40 | −560 | | | | |
| | 700 | 40 | −660 | | | | |
| | 800 | 40 | −760 | | | | |
| | 900 | 40 | −860 | | | | |

TABLE 20

| J · Prsvp_TX = 80 | k | | | | | |
|---|---|---|---|---|---|---|
| | 0 | 1 | 2 | 3 | 4 | 5 |
| Prsvp_RX 200 | 80 | −120 | −320 | −520 | −720 | −920 |
| 300 | 80 | −220 | −520 | −820 | | |
| 400 | 80 | −320 | −720 | | | |
| 500 | 80 | −420 | −920 | | | |
| 600 | 80 | −520 | | | | |
| 700 | 80 | −62 | | | | |
| 800 | 80 | −720 | | | | |
| 900 | 80 | −820 | | | | |

TABLE 21

| J · Prsvp_TX = 120 | k | | | | | |
|---|---|---|---|---|---|---|
| | 0 | 1 | 2 | 3 | 4 | 5 |
| Prsvp_RX 200 | 120 | −80 | −280 | −480 | −680 | −880 |
| 300 | 120 | −180 | −480 | −780 | | |
| 400 | 120 | −280 | −680 | | | |
| 500 | 120 | −380 | −880 | | | |
| 600 | 120 | −480 | | | | |
| 700 | 120 | −580 | | | | |
| 800 | 120 | −680 | | | | |
| 900 | 120 | −780 | | | | |

TABLE 22

| J · Prsvp_TX = 160 | k | | | | | |
|---|---|---|---|---|---|---|
| | 0 | 1 | 2 | 3 | 4 | 5 |
| Prsvp_RX 200 | 160 | −40 | −240 | −440 | −640 | −840 |
| 300 | 160 | −140 | −440 | −740 | −1040 | |
| 400 | 160 | −240 | −640 | −1040 | | |
| 500 | 160 | −340 | −840 | | | |
| 600 | 160 | −440 | −1040 | | | |
| 700 | 160 | −540 | | | | |
| 800 | 160 | −640 | | | | |
| 900 | 160 | −740 | | | | |

Therefore, since $P_a$ denotes the maximum common divisor of ($P_{rsvp\_TX}$, $P_{rsvp\_RX}$) and $P_{rsvp\_RX}$ is limited to 200, 300, ..., 900 ms, $P_a=P_{rsvp\_TX}$ if $P_{rsvp\_TX}$ is a divisor of 100. Also, for example, if $P_{rsvp\_TX}$ is a multiple of 20, $P_a=20$.

In detail, for example, if $P_{rsvp\_TX}=100$, $P_a=100$ and $y-k\cdot P_a=y-k\cdot 100$. For example, the aforementioned description may be the same as in the existing system (e.g., LTE system). Also, for example, if $P_{rsvp\_TX}=20, 40, 60, 80$, $P_a=20$ and $y-k\cdot P_a=y-k\cdot 20$. Based on the aforementioned description, the second sensing window duration 1520 of FIG. 15 may be limited to $P_{rsvp\_TX}=100$ or $P_{rsvp\_TX}=20, 40, 60, 80$. For example, the aforementioned limitation may be performed through the network.

On the contrary, for example, a case in which $P_{rsvp\_TX}=50, 25, 10$ may be considered. Here, $P_a=P_{rsvp\_TX}$ and $y-k\cdot P_a=y-k\cdot P_{rsvp\_TX}$. However, in FIG. 15, the second sensing window duration 1520 may not be set to $P_{rsvp\_TX}=50, 25, 10$. In detail, for example, in the case of TDD of the existing system (e.g., LTE system), a UL-DL configuration may be configured in units of 10 ms. Considering this, all of $P_{rsvp\_TX}$ and $P_{rsvp\_RX}$ considered in the existing system may be 10 ms. Here, in the existing system, when a unit of ms is converted from a physical value to a logical unit, a subframe unit (=1 ms) may be fitted.

On the contrary, in the case of the new communication system (e.g., NR system), a UL-DL configuration may be a unit of 20 ms. Considering this, the physical value of ms may be converted to the logical value based on the above Equation 3 and FIG. 14. That is, unless $P_{rsvp\_TX}$ is a multiple of 20 ms, a slot unit may not be fitted between the unit of ms and the logical value as in FIG. 14. That is, in a case in which $P_a$ is a maximum common divisor of ($P_{rsvp\_TX}$, $P_{rsvp\_RX}$) and $P_{rsvp\_RX}$ is limited to 200, 300, ..., 900 ms, if $P_{rsvp\_TX}$ is a divisor of 100 ms but is not a multiple of 20 ms, it may not be used as a partial sensing window duration. That is, the maximum divisor of ($P_{rsvp\_TX}$, $P_{rsvp\_RX}$) cannot be $P_a=P_{rsvp\_TX}$. For example, in a case in which $P_{rsvp\_TX}=50$ ms and $P_{rsvp\_RX}$ is limited to 200, 300, ..., 900 ms, a minimum common multiple in the ms unit may be $P_a=P_{rsvp\_TX}=50$ ms, but may be $P'_{rsvp\_TX}=28$ that is converted to the logical value based on Equation 3 and $P'_{rsvp\_RX}=110, 165, 220, ...$. Therefore, the minimum common multiple may not be 28 and the use thereof may be limited.

That is, the UE may perform sensing, such as full sensing, in the sensing window 1 (1510), based on FIG. 15 and may perform sensing, such as partial sensing, in the sensing window 2 (1520). Here, for example, in the case of performing sensing based on the aforementioned method, the selection window may be [n+$T_1$, n+$T_2$] in association with the sensing window 1 (1510). Also, the selection window may be selected by sensing from the resource pool that belongs to the resource area corresponding to Y slots within [n+$T_1$, n+$T_2$] in association with the sensing window 2 (1520).

For example, the sensing window 1 (1510) may be configured with slot [n−100·2$^u$, n−$T_{proc,0}$], and the sensing window 2 (1520) may be configured with slot $t_{y-k\times P_a}^{SL}$. Here, the sensing window 2 (1520) may be k×$P_a$>100·2$^u$ and may be configured based on a k$^{th}$ bit that set as 1 of an upper layer parameter "gapCandidateSensing". For example, as described above, if $P_{rsvp\_TX}=100$ ms, $P_a=100\cdot 2^u$ and if $P_{rsvp\_TX}=20, 40, 60$ or 80 ms, $P_a=20\cdot 2^u$. That is, although they are divisors of 100 ms, some periodicity values may not be used by logical value conversion, which is described above (e.g., 50 ms, 25 ms). Also, for example, when the UE performs sensing in two sensing window durations based on FIG. 15, the sensing duration and range may need to be set.

Figure 16:
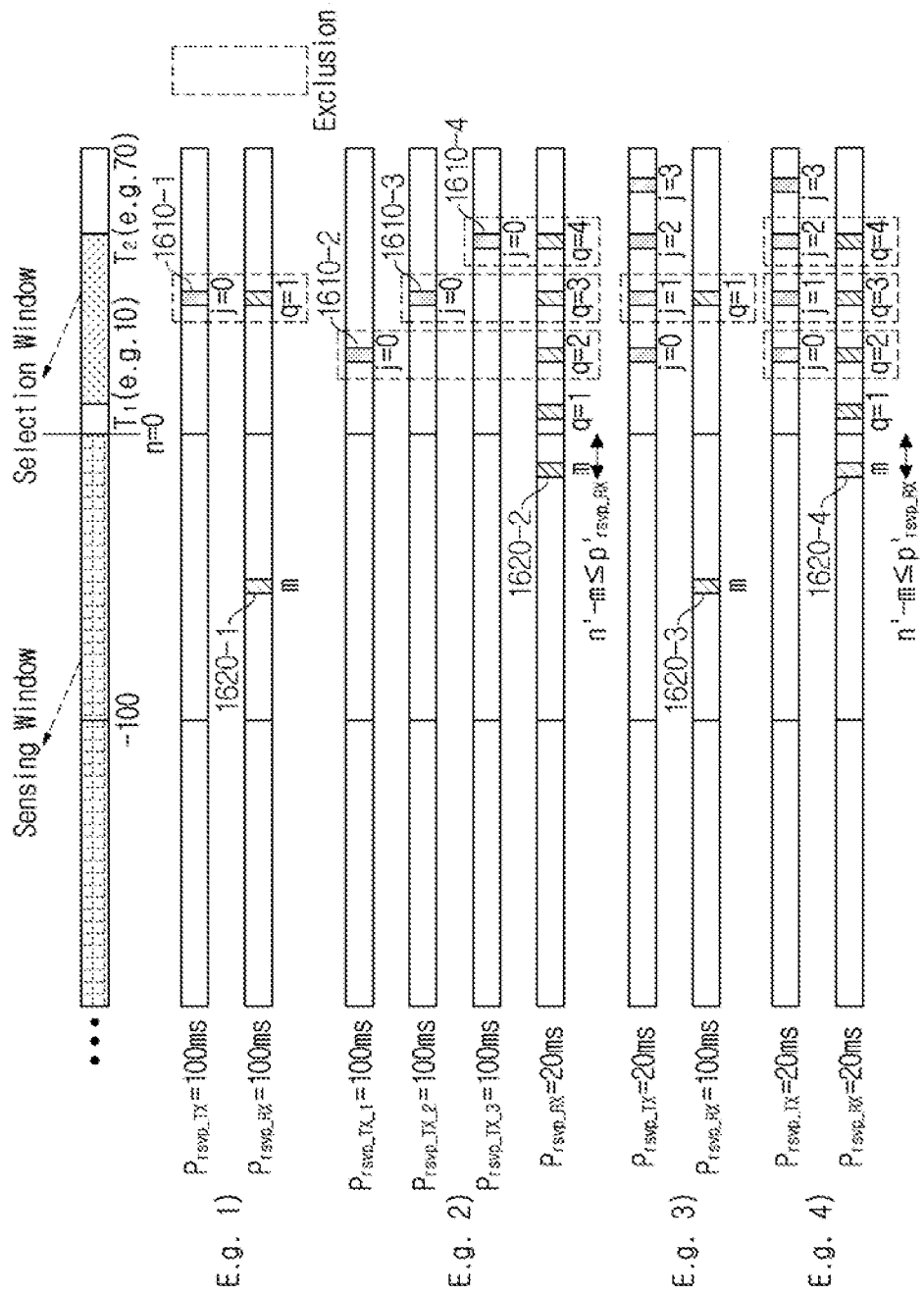
FIG. 16 illustrates an example of full sensing in a new communication system to which the present disclosure may apply.

For example, FIG. 16 illustrates an example of full sensing of a new communication system to which the present disclosure may apply.

For example, referring to FIG. 16, as described above, the selection window may be [n+$T_1$, n+$T_2$]. Here, for example, as described above, the UE may perform resource exclusion based on the aforementioned NR full sensing. That is, the UE may verify data reception of another UE in a slot m within the sensing window. For example, as described above, the UE may receive SCI and may compare the received SCI to a threshold.

Here, based on slot m, it may be verified that resources scheduled for transmission periodically thereafter from slot m on the time domain (that is, resources expected to receive data) overlap with slot y and resources scheduled for transmission periodically thereafter from slot y.

At this time, as described above, resources scheduled for transmission periodically thereafter from slot m($t_m^{SL}$) (that is, resources expected to receive data) may be written as slot $$m + qxP'_{rsvp\_RX}\left(t_{m+qxP'_{rsvp\_RX}}^{SL}\right),$$

and slot y and resources scheduled for transmission periodically thereafter from slot y may be written as slot $$y + jx P'_{rsvp\_RX}\left(t^{SL}_{m+qxP'_{rsvp\_RX}}\right).$$

In slot $$m + qx P'_{rsvp\_RX}\left(t^{SL}_{m+qxP'_{rsvp\_RX}}\right),$$

it may be q=1, 2, ..., Q. At this time, in case of $P_{rsvp\_RX}<T_{scal}$ and n'−m≤; $P'_{rsvp\_RX}$, a value of Q is calculated according to Equation 5, and otherwise, Q=1. Here, $T_{scal}$ may a value corresponding to an ms value of $T_2$. In detail, for example, in FIG. 16, since $T_{scal}$=70, if $P_{rsvp\_RX}$=100 ms, $P_{rsvp\_RX}>T_{scal}$ and thus Q=1. Also, for example, if $P_{rsvp\_RX}$=20 ms, $P_{rsvp\_RX}<T_{scal}$ and Q=4 for n'−m≤$P'_{rsvp\_RX}$. Here, n'−m≤$P'_{rsvp\_RX}$ may be a condition for determining the slot m that is within the period of one $P'_{rsvp}$ RX from n'.

$$Q = \left\lceil \frac{T_{scal}}{P_{rsvp\_RX}} \right\rceil \quad \text{[Equation 5]}$$

Also, j may be one of values selected by carrier-specific network configuration or pre-configuration for each carrier used for V2X within the range of [0, 1, ..., 10].

Referring to FIG. 16, when a resource in which $P_{rsvp\_TX}$ is set to 100 ms (1610-1) and a resource set to $P_{rsvp\_RX}$=20 ms based on the slot m (1620-2) overlap, the corresponding resource may be excluded within the selection window duration.

Also, for example, in FIG. 16, each resource in which each $P_{rsvp\_TX}$ is set to 100 ms (1610-2, 1610-3, 1610-4) and a resource set to $P_{rsvp\_RX}$=20 ms based on the slot m (1620-2) overlap, the corresponding resource may be excluded within the selection window duration.

Also, for example, in FIG. 16, when $P_{rsvp\_TX}$ is set to 20 ms and a resource set to $P_{rsvp\_RX}$=100 ms based on the slot m (1620-3) overlaps, the corresponding resource may be excluded within the selection window duration.

Also, for example, in FIG. 16, when $P_{rsvp\_TX}$ is set to 20 ms and resources set to $P_{rsvp\_RX}$=20 ms based on the slot m (1620-4) overlap, the overlapping resources may be excluded within the selection window duration.

Figure 17:
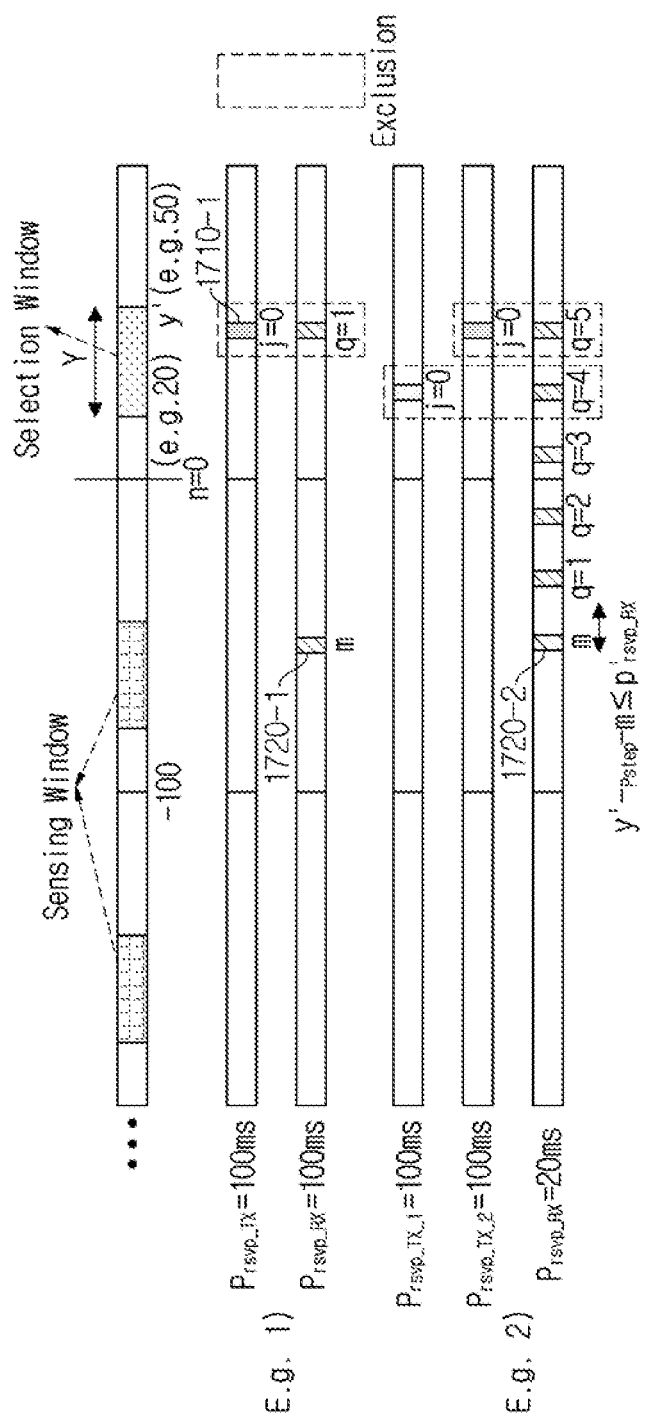
FIG. 17 illustrates an example of partial sensing in an existing communication system to which the present disclosure may apply.

Also, for example, FIG. 17 illustrates an example of partial sensing of the existing communication system to which the present disclosure may apply. For example, the sensing window may be configured based on the aforementioned LTE partial sensing. In detail, the sensing duration may be configured based on arbitrary y within Y slots and may be the same as described above. Here, resource exclusion may be performed in consideration of a value of $P_{rsvp\_RX}$. For example, referring to FIG. 17, as described above, the UE may verify data reception of another UE in a slot m within a sensing window duration 2. For example, the UE may receive SCI and may compare the received SCI to a threshold as described above.

Here, based on slot m, it may be verified that resources scheduled for transmission periodically thereafter from slot m on the time domain (that is, resources expected to receive data) overlap with slot y and resources scheduled for transmission periodically thereafter from slot y.

At this time, as described above, resources scheduled for transmission periodically thereafter from slot $m(t_m^{SL})$ (that is, resources expected to receive data) may be written as $$m + qx P'_{rsvp\_RX}\left(t^{SL}_{m+qxP'_{rsvp\_RX}}\right),$$

and slot y and resources scheduled for transmission periodically thereafter from slot y may be written as slot $$y + jx P'_{rsvp\_RX}\left(t^{SL}_{m+qxP'_{rsvp\_RX}}\right).$$

In slot $$m + qx P'_{rsvp\_RX}\left(t^{SL}_{m+qxP'_{rsvp\_RX}}\right),$$

it may be q=1, 2, ..., Q. At this time, in case of $P_{rsvp\_RX\_r}<1$ and y'−$P_{step}$−m≤$P'_{rsvp\_RX}$, a value of Q is calculated according to Equation 6, and otherwise, Q=1. Here, y'−$P_{step}$−m≤$P_{rsvp\_RX}$ may be a condition for determining the slot m that is within the period of one $P'_{rsvp\_RX}$ from y'−$P_{step}$ and in FIG. 16, not n' but y'−$P_{step}$ may be applied.

$$Q = \frac{1}{P_{rsvp\_RX\_r}} \quad \text{[Equation 6]}$$

Also, j may be one of values selected by carrier-specific network configuration or pre-configuration for each carrier used for V2X within the range of [0, 1, ..., 10].

In detail, for example, referring to FIG. 17, $P_{step}$=100. For example, $P_{step}$ may be a period at which data transmission is performed. Here, if $P_{rsvp\_RX}$=100 ms, $P_{rsvp\_RX}>1$ and thus, Q=1. Also, if $P_{rsvp\_RX}$=20 ms, $P_{rsvp\_RX}<1$ and thus, resources from the slot m (1720-2) to q=5 may be considered and resources that overlap control channel and data channel transmission may be excluded.

Figure 18:
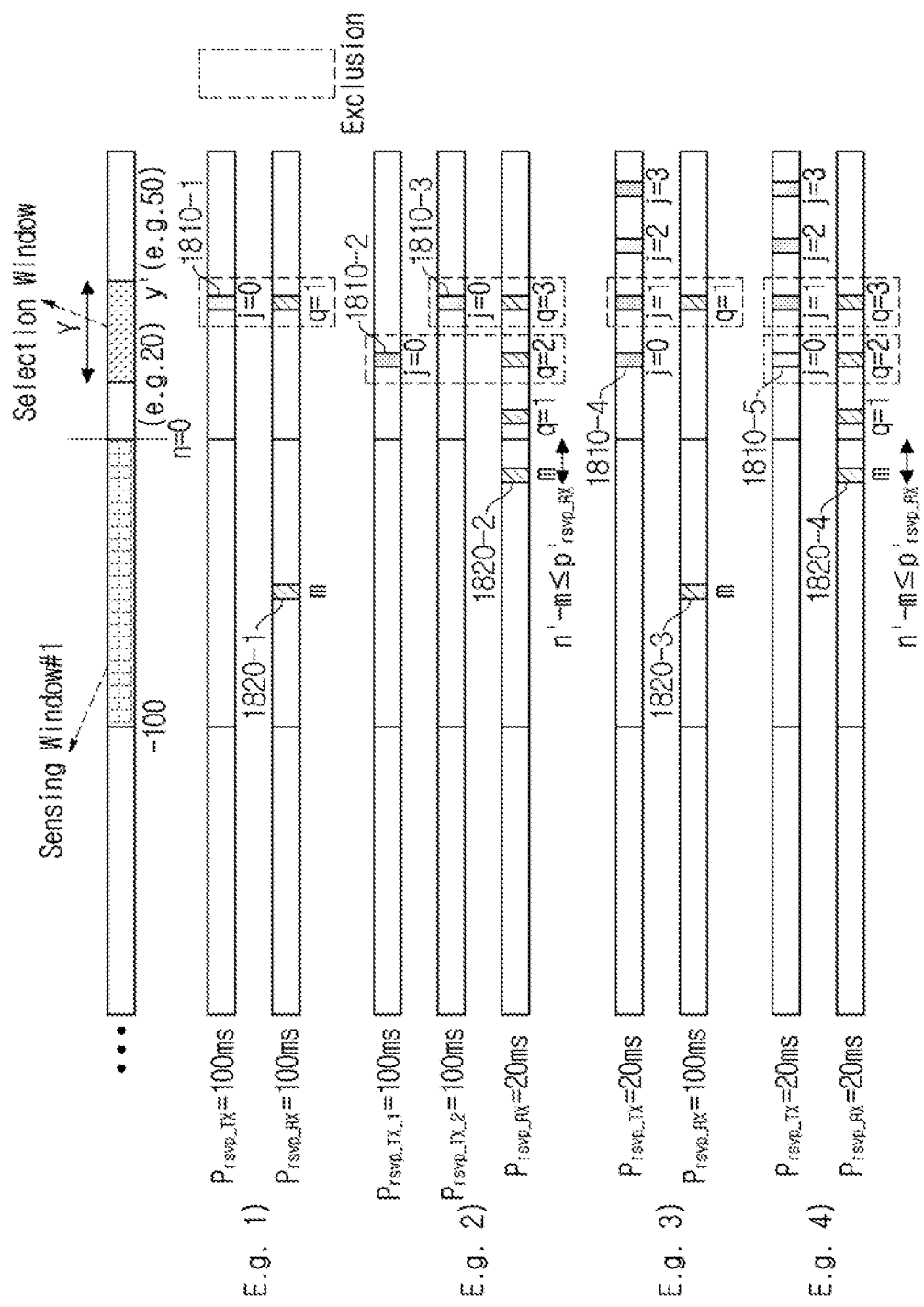
FIG. 18 illustrates an example of a sensing range when a sensing window is divided into two durations to which the present disclosure may apply.

FIG. 18 illustrates an example of a sensing range when a sensing window is divided into two durations to which the present disclosure may apply.

As described above, a sensing duration of FIG. 15 may need to be configured in consideration of full sensing of NR (FIG. 16) and partial sensing of LTE (FIG. 17). For example, as described above, the sensing window may be configured with sensing window 1 and sensing window 2. Here, in the sensing window 1, sensing may be performed such as full sensing, and in the sensing window 2, sensing may be performed such as partial sensing. Here, for example, referring to FIG. 18, the UE may perform NR partial sensing based on the two sensing window durations. Here, in the sensing window 1, the UE may perform resource exclusion in consideration of Y slot durations. That is, in NR partial sensing, the selection window may include Y slots. Here, the sensing window 1 may be a duration in which the UE performs sensing, such as full sensing, by n−100 ms. When the UE performs sensing based on the sensing window duration 1, the UE may perform resource exclusion, such as resource exclusion of the NR full sensing. Here, dissimilar to NR full sensing, sensing is performed only by n−100 ms and thus, a detailed configuration for the resource exclusion may be changed.

For example, referring to FIG. 18, the UE may verify data reception of another UE in a slot m (1820-1) in the sensing window duration 1. For example, the UE may receive SCI and may compare the received SCI to a threshold, and an operation related thereto may be the same as the aforementioned NR full sensing.

Here, based on slot m, it may be verified that resources scheduled for transmission periodically thereafter from slot m on the time domain (that is, resources expected to receive data) overlap with slot y and resources scheduled for transmission periodically thereafter from slot y.

At this time, as described above, resources scheduled for transmission periodically thereafter from slot $m(t_m^{SL})$ (that is, resources expected to receive data) may be written as slot $$m + qxP'_{rsvp\_RX}\left(t^{SL}_{m+qxP'_{rsvp\_RX}}\right),$$

and slot y and resources scheduled for transmission periodically thereafter from slot y may be written as slot $$y + jxP'_{rsvp\_TX}\left(R_{x,y+jxP'_{rsvp\_TX}}\right).$$

In slot $$m + qxP'_{rsvp\_RX}\left(t^{SL}_{m+qxP'_{rsvp\_RX}}\right),$$

it may be q=1, 2, ..., Q. At this time, in case of $P_{rsvp\_RX} < T_{y'}$ and $n'-m \leq P_{rsvp\_RX}$, a value of Q is calculated according to Equation 7, and otherwise, Q=1. Dissimilar to FIG. 16 described above, $T_{scal}$ may be $T_{y'}$. That is, in FIG. 16, $T_2$ corresponds to $T_{scal}$ as the selection window, but includes Y slots and thus, needs to be changed to Ty. Here, when $t^{SL}_{y'}$ is the last slot within selection window Y, Ty, may be a value acquired by converting $t^{SL}_{y'}$ to y' based on a unit of ms. Also, for example, the sensing window duration is within 100 ms and thus, only $P_{rsvp\_RX}$100 ms may be considered.

In detail, for example, in FIG. 18, $T_{y'}$=50. Here, if $P_{rsvp\_RX}$=100 ms, $P_{rsvp\_RX} > T_{y'}$ and thus, Q=1. Also, if $P_{rsvp\_RX}$=20 ms, $P_{rsvp\_RX} < T_{y'}$ and Q=3 for $n'-m \leq P'_{rsvp\_RX}$.

$$Q = \left\lceil \frac{T_{y'}}{P_{rsvp\_RX}} \right\rceil \quad \text{[Equation 7]}$$

Also, j may be one of values selected by carrier-specific network configuration or pre-configuration for each carrier used for V2X within the range of [0, 1, ..., 10].

Also, referring to FIG. 18, when a resource (1810-1) in which $P_{rsvp\_TX}$ is set to 100 ms and a resource set to $P_{rsvp\_RX}$=100 ms based on the slot m (1820-1) overlap, the corresponding resource may be excluded within the selection window duration.

Also, referring to FIG. 18, when each resource (1810-2, 1810-3) in which $P_{rsvp\_TX}$ is set to 100 ms and a resource set to $P_{rsvp\_RX}$=20 ms overlaps based on the slot m (1820-2) overlap, the corresponding resource may be excluded within the selection window duration.

Also, for example, in FIG. 18, when $P_{rsvp\_TX}$ is set to 20 ms and a resource set to $P_{rsvp\_RX}$=100 ms based on the slot m (1820-3) overlaps, the corresponding resource may be excluded within the selection window duration.

Also, for example, in FIG. 18, when $P_{rsvp\_TX}$ is set to 20 ms and resources set to $P_{rsvp\_RX}$=20 ms based on the slot m (1820-4) overlap, the overlapping resources may be excluded within the selection window duration.

Then, the sensing window 2 may be considered. Here, for example, in the sensing window 2, sensing, such as partial sensing, may be performed. For example, FIG. 19 illustrates an example of partial sensing in the case of dividing the sensing window into two durations to which the present disclosure may apply.

Figure 19:
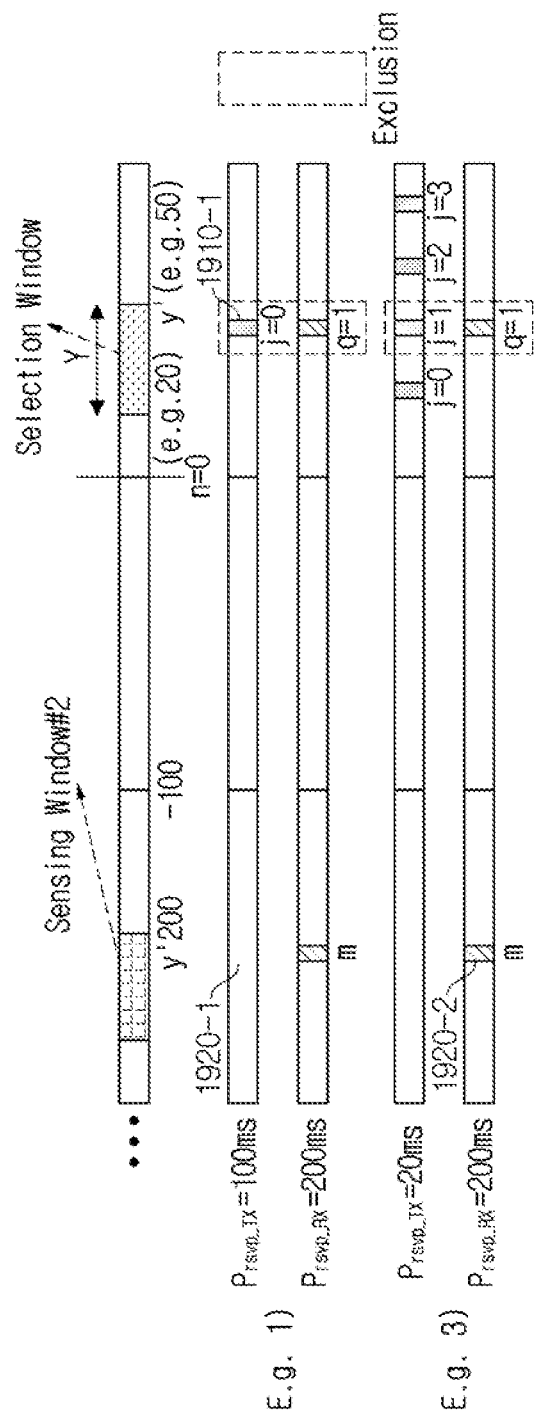
FIG. 19 illustrates an example of a sensing range when a sensing window is divided into two durations to which the present disclosure may apply.

For example, FIG. 19 illustrates an example of the sensing window 2 in which sensing, such as partial sensing, is performed between two sensing window durations. For example, the sensing window may be configured based on the aforementioned LTE partial sensing. In detail, the sensing duration may be configured based on arbitrary y within Y slots and may be the same as described above. Here, resource exclusion may be performed in consideration of a value of $P_{rsvp\_RX}$. For example, referring to FIG. 19, the UE may verify data reception of another UE in a slot m within sensing window duration 2. For example, as described above, the UE may receive SCI and may compare the received SCI to a threshold.

Here, based on slot m, it may be verified that resources scheduled for transmission periodically thereafter from slot m on the time domain (that is, resources expected to receive data) overlap with slot y and resources scheduled for transmission periodically thereafter from slot y.

At this time, as described above, resources scheduled for transmission periodically thereafter from slot $m(t_m^{SL})$ (that is, resources expected to receive data) may be written as slot $$m + qxP'_{rsvp\_RX}\left(t^{SL}_{m+qxP'_{rsvp\_RX}}\right),$$

and slot y and resources scheduled for transmission periodically thereafter from slot y may be written as slot $$y + jxP'_{rsvp\_TX}\left(R_{x,y+jxP'_{rsvp\_TX}}\right).$$

In slot $$m + qxP'_{rsvp\_RX}\left(t^{SL}_{m+qxP'_{rsvp\_RX}}\right),$$

it may be q=1, 2, ..., Q. However, the sensing window 2 may be configured after 100 ms and, referring to FIG. 15, only $P_{rsvp\_RX} >$ 100 ms may be considered. Therefore, Q may be 1 at all times based on Equation 6 and a condition related thereto.

Also, j may be one of values selected by carrier-specific network configuration or pre-configuration for each carrier used for V2X within the range of [0, 1, ..., 10].

In detail, for example, referring to FIG. 19, if $P_{rsvp\_TX}$=100 ms and $P_{rsvp\_RX}$=200 ms, Q may be 1 at all times. Also, if $P_{rsvp\_TX}$=20 ms and $P_{rsvp\_RX}$=200 ms, Q is 1 at all times. Therefore, whether a subsequent resource overlaps a control channel and data channel transmission after the slot m (1920-2) may be determined.

As another example, as the aforementioned case in which the UE performs NR partial sensing based on the aforementioned two sensing windows, a case in which the UE does not perform monitoring in $t^{SL}_m$ in the sensing window 1 (sensing window in which $P_{rsvp\_RX}$100 ms is considered) may be considered. That is, as described above, the UE may exclude a portion in which a transmission according to the period $P_{rsvp\_RX}$ from a corresponding skipped slot may overlap, in consideration of potential effect in slots in which sensing is skipped.

Here, in the sensing window 2 (sensing window in which $P_{rsvp\_RX}$>100 is considered), slots in which the UE does not perform monitoring in $t^{SL}_m$ may not be pre-configured within Y slots. Therefore, the aforementioned skipped slot may not occur.

Therefore, when NR partial sensing is performed based on the aforementioned description, it corresponds to a case in which $P_{rsvp\_RX}$≤100 ms. Therefore, only for values of 100 ms or less among higher-layer-allowed periodicity values, the UE may exclude a portion in which a transmission according to the period $P_{rsvp\_RX}$ from a corresponding skipped slot may overlap, in consideration of potential effect in slots in which sensing is skipped.

Table 23 is a table comparing a resource selection interval in the full sensing in the NR system and a resource selection interval in partial sensing of the present disclosure.

TABLE 23

| | |
|---|---|
| NR full sensing | Time interval [n + $T_1$, n + $T_2$] |
| Partial sensing of the present disclosure | A set of slots which consists of at least Y slosts within the time interval [n + $T_1$, n + $T_2$] |

Table 24 is a table comparing a sensing window duration in the full sensing in the NR system and a sensing window duration of the present disclosure.

In Table 24, if $P_{rsvp\_TX}$=100 ms, $P_a$ is 100 ms, and if $P_{rsvp\_TX}$=20 ms, 40 ms, 60 ms or 80 ms, $P_a$=20 ms, as described in from Table 13 to Table 15.

TABLE 24

| | |
|---|---|
| NR full sensing | slots [n − $T_0$, n − $T_{proc, 0}^{SL}$] |
| Partial sensing of the present disclosure | 1) sensing window #1<br>slots [n − 100 · $2^u$, n − $T_{proc, 0}^{SL}$]<br>2) sensing window #2<br>slots $t_{y-k \times P_a}^{SL}$ if k-th bit of the high layer parameter gapCandidateSensing is set to 1 here k x $P_a$ > 100 · $2^u$<br>$P_a$ = 100 · $2^u$ if $P_{rsvp\_TX}$ = 100 ms<br>$P_a$ = 20 · $2^u$ if $P_{rsvp\_TX}$ = 20, 40, 60 or 80 ms |

Figure 20:
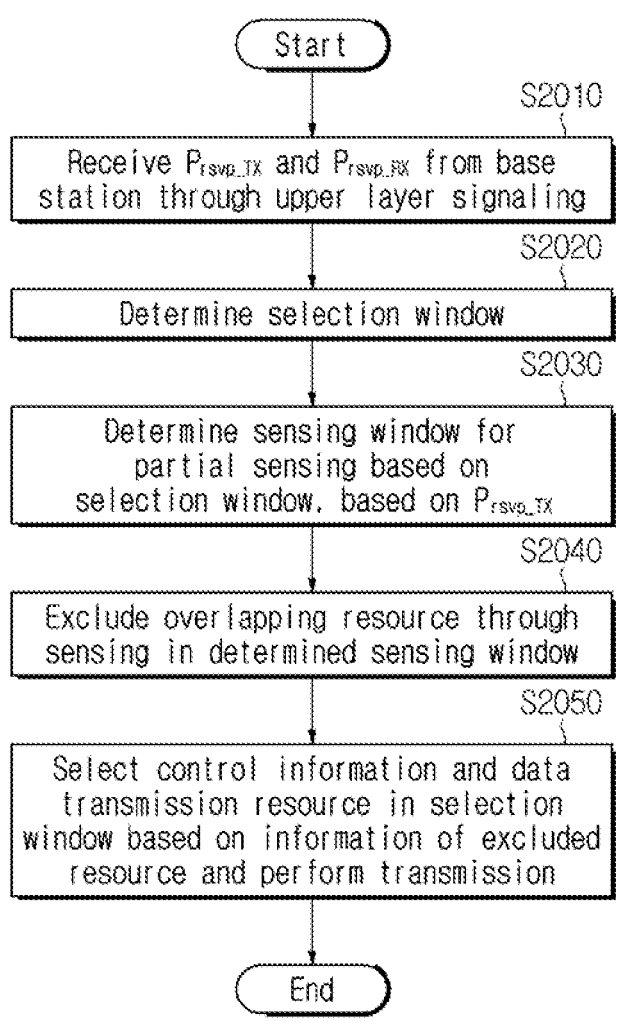
FIG. 20 is a flowchart illustrating an example of a method of performing transmission based on partial sensing to which the present disclosure may apply.

FIG. 20 is a flowchart illustrating an example of a method of performing transmission based on partial sensing to which the present disclosure may apply.

Referring to FIG. 20, the UE may perform a partial sensing operation based on an NR communication system.

Here, in operation S2010, the UE may receive a transmission resource reservation period ($P_{rsvp\_TX}$) and a reception resource reservation period ($P_{rsvp\_RX}$) from a base station through upper layer signaling. For example, as described above with reference to FIGS. 1 to 19, resource reservation periods of the new communication system (e.g., NR system) and the existing communication system (e.g., LTE communication system) may be differently set.

In operation S2020, the UE may select a selection window. For example, as described above, in the case of a full sensing method, the selection window may be determined as [n+$T_1$, n+$T_2$]. In the case of a partial sensing method, the selection window may be determined as Y slots within the duration [n+$T_1$, n+$T_2$].

In operation S2030, the UE may determine the sensing window for partial sensing based on the selection window, based on the transmission resource reservation period ($P_{rsvp\_TX}$). For example, as described above, the UE may monitor all the slots corresponding to y−k*$P_a$ with respect to arbitrary slot y within Y slots and, based thereon, the sensing window may be determined.

Here, in y−k*$P_a$ for configuring the sensing window, a value of $P_a$ may be set based on the transmission resource reservation period. Here, as described above, the UE needs to verify a resource in which data reception from another UE is performed and to perform a resource exclusion and thus, needs to verify a resource based on the reception resource reservation period ($P_{rsvp\_RX}$).

For example, if the reception resource reservation period is not a divisor or a multiple of the transmission resource reservation period, the UE needs to configure the sensing window duration for the reception resource reservation period. On the contrary, if the reception resource reservation period is the divisor or the multiple of the transmission resource reservation period, the UE may also verify data reception in the case of sensing the transmission resource reservation period. Considering this, the reception resource reservation period signaled from the upper layer may be set to a value limited by the transmission resource reservation period. For example, the reception resource reservation period may be set to a value that is a divisor or a multiple of the transmission resource reservation period and is not limited to the aforementioned example. Also, for example, as described above, a physical value of ms may be converted to a logical value and applied in TDD. Considering this, the reception resource reservation period may be set to a multiple of 20 ms and is not limited to the aforementioned example.

In operation S2040, the UE may exclude an overlapping resource through sensing in the determined sensing window. Here, for example, in the case of full sensing, the UE may further exclude a corresponding resource when the UE does not perform monitoring (or sensing). Here, in the case of partial sensing, a duration in which the UE does not perform monitoring is excluded in advance in setting the aforementioned Y and thus, the resource exclusion may be performed only with the aforementioned operation.

In operation S2050, the UE may select a control information and data transmission resource in the selection window based on information of the excluded resource and may perform transmission. Here, for example, as described above, the resource exclusion may be configured within the aforementioned Y duration and may be configured to not be applied outside the Y duration.

Figure 21:
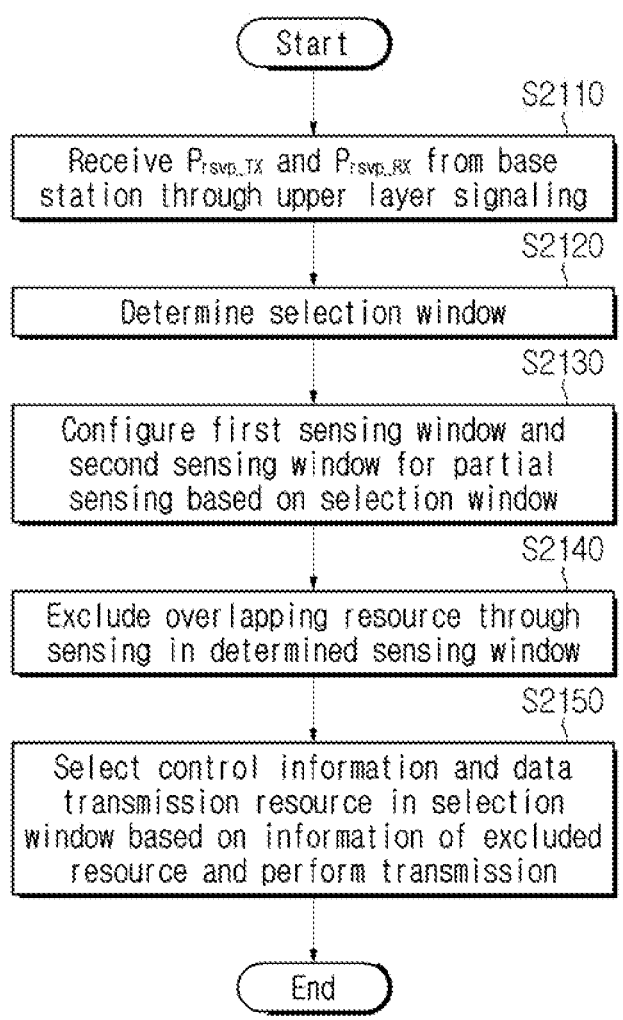
FIG. 21 is a flowchart illustrating an example of a method of performing transmission based on partial sensing to which the present disclosure may apply.

FIG. 21 is a flowchart illustrating an example of a method of performing transmission based on partial sensing to which the present disclosure may apply.

Referring to FIG. 21, the UE may perform a partial sensing operation based on an NR communication system.

In operation S2110, the UE may receive a transmission resource reservation period ($P_{rsvp\_TX}$) and a reception resource reservation period ($P_{rsvp\_RX}$) from a base station through upper layer signaling. As described above with reference to FIGS. 1 to 19, resource reservation periods of the new communication system (e.g., NR system) and the existing communication system (e.g., LTE communication system) may be differently configured.

In operation S2120 the UE may determine a selection window. For example, in the case of a full sensing method, the selection window may be determined as [n+T$_1$, n+T$_2$]. As described above, in the case of partial sensing, the selection window may be determined with Y slots within the duration [n+T$_1$, n+T$_2$].

In operation S2130, the UE may configure the first sensing window and the second sensing window based on the selection window. Here, in the first sensing window, sensing, such as full sensing, may be performed. For example, the first sensing window may be configured by n−100 ms. Also, for example, in the second sensing window, sensing, such as partial sensing, may be performed. For example, the second sensing window may be configured after 100 ms.

In detail, the resource reservation period of the NR system may be configured based on a unit of 1 ms or a smaller unit in 100 ms or less. For sensing of this, the first sensing window may be configured. On the contrary, since the resource reservation period may be configured based on a unit of 100 m after 100 ms, sensing, such as partial sensing, may be performed.

In operation S2140, the UE may exclude an overlapping resource through sensing in the determined sensing window. Here, for example, in the case of full sensing, the UE may further exclude a corresponding resource when the UE does not perform monitoring (or sensing). Here, in the case of partial sensing, a duration in which the UE does not perform monitoring in setting Y may be excluded in advance. Therefore, in the first sensing window, the UE may perform resource exclusion in consideration of a resource in which the UE does not perform monitoring. On the contrary, in the second sensing window, the resource exclusion may be performed irrespective of whether the UE performs monitoring.

In operation S2150, for example, the UE may select a control information and data transmission resource in the selection window based on information of the excluded resource and may perform transmission. Here, for example, as described above, the resource exclusion may be configured within the duration Y and may be configured to not be applied outside the duration Y.

Figure 22:
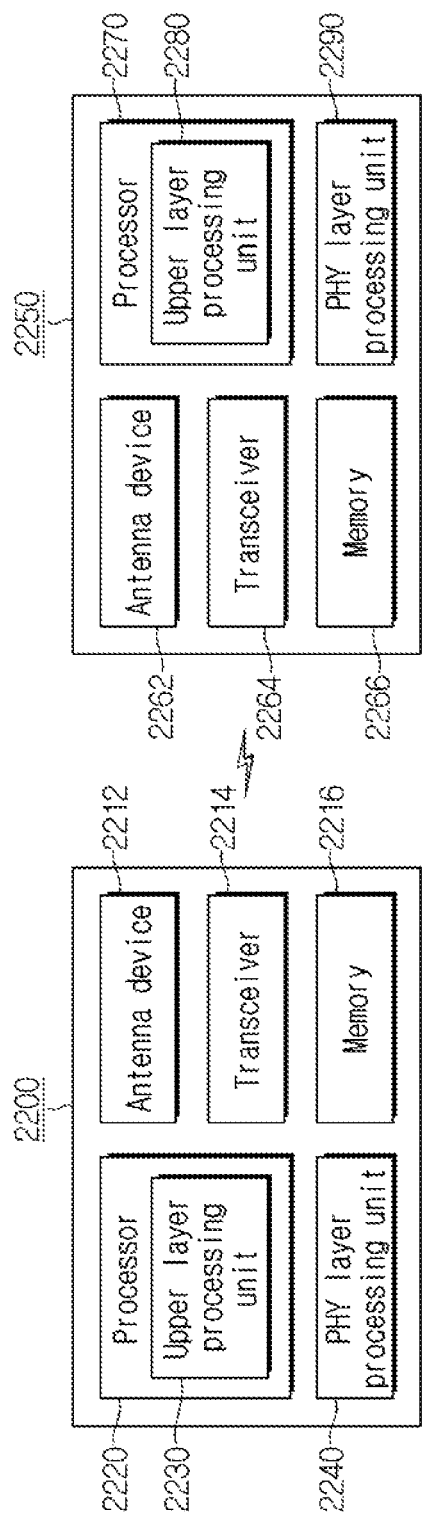
FIG. 22 is a diagram illustrating a base station device and a terminal device to which the present disclosure may apply.

FIG. 22 is a diagram illustrating a configuration of a base station device and a terminal device according to the present disclosure may apply.

A base station device 2200 may include a processor 2210, an antenna device 2212, a transceiver 2214, and a memory 2216.

The processor 2220 may perform baseband-related signal processing and may include an upper layer processing unit 2230 and a physical (PHY) layer processing unit 2240. The upper layer processing unit 2230 may process an operation of a MAC layer, an RRC layer, or more upper layers. The PHY layer processing unit 2240 may process an operation (e.g., uplink received signal processing, downlink transmission signal processing, etc.) of a PHY layer. The processor 2220 may also control the overall operation of the base station device 2200, in addition to performing the baseband-related signal processing.

The antenna device 2212 may include at least one physical antenna. If the antenna device 2212 includes a plurality of antennas, multiple input multiple output (MIMO) transmission and reception may be supported. The transceiver 2214 may include a radio frequency (RF) transmitter and an RF receiver. The memory 2216 may store operation-processed information of the processor 2220, software, an operating system (OS), an application, etc., associated with an operation of the base station device 2200, and may include a component, such as a buffer.

The processor 2220 of the base station device 2200 may be configured to implement an operation of a base station in the embodiment(s) set forth herein.

The terminal device 2250 may include a processor 2270, an antenna device 2262, a transceiver 2264, and a memory 2266. For example, the terminal device 2250 may communicate with the base station device 2200. As another example, the terminal device 2250 may perform sidelink communication with another terminal device. That is, the terminal device 2250 may refer to any device capable of communicating with at least one of the base station device 2200 and another terminal device and is not limited to communication with a specific device.

The processor 2270 may perform baseband-related signal processing and may include an upper layer processing unit 2280 and a PHY layer processing unit 2290. The upper layer processing unit 2280 may process an operation of a MAC layer, an RRC layer, or more upper layers. The PHY layer processing unit 2290 may process an operation (e.g., downlink received signal processing, uplink transmission signal processing, etc.) of a PHY layer. The processor 2270 may also control the overall operation of the terminal device 2250 in addition to performing the baseband-related signal processing.

The antenna device 2262 may include at least one physical antenna. If the antenna device 2262 includes a plurality of antennas, MIMO transmission and reception may be supported. The transceiver 2264 may include an RF transmitter and an RF receiver. The memory 2266 may store operation-processed information of the processor 2270, software, an OS, an application, etc., associated with an operation of the terminal device 2250, and may include a component, such as a buffer.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present invention includes a software or machine executable instructions (for example, operating system, application, firmware, program, etc.) for enabling to implement operations according to the methods of the various embodiment(s), and a device or a non-transitory computer-readable medium executable on a computer storing such a software or instructions.

The present disclosure relates to device-to-device (D2D) communication in a wireless communication system and may apply to partial sensing for D2D communication.

What is claimed is:

1. A method comprising:
   receiving, by a first wireless user device, configuration information indicating:
      a resource pool for sidelink communication;
      a plurality of resource reservation periods; and
      a subset of the plurality of resource reservation periods for partial sensing;

determining a slot in a selection window;
monitoring, for a first partial sensing and based on the slot in the selection window, each slot of a first sensing window;
monitoring, for a second partial sensing, a first subset of slots of a plurality of slots in a second sensing window, wherein each slot of the first subset of slots is offset from the slot in the selection window based on at least one periodicity value of the subset of the plurality of resource reservation periods for partial sensing; and
transmitting, based on at least one of the first partial sensing or the second partial sensing, a sidelink signal to a second wireless user device via at least one resource of the slot in the selection window.

2. The method of claim 1, wherein the subset of the plurality of resource reservation periods for partial sensing is determined by excluding at least one periodicity value from the plurality of resource reservation periods.

3. The method of claim 1, wherein:
the slot in the selection window comprises at least one y slot,
the first subset of slots corresponds to $(y-k \times P_a)$ slots,
y is the at least one y slot,
k is an integer,
$P_a$ is the at least one periodicity value of the subset of the plurality of resource reservation periods for partial sensing, and
$k \times P_a$ is an offset between the y slot and a slot of the first subset of slots.

4. The method of claim 1, wherein the plurality of resource reservation periods comprises 0 ms, 1 ms, 2 ms, . . . , 99 ms, 100 ms, 200 ms, 300 ms, 400 ms, 500 ms, 600 ms, 700 ms, 800 ms, and 900 ms.

5. The method of claim 4, wherein the plurality of resource reservation periods corresponds to sl-ResourceReservePeriodList.

6. The method of claim 1, wherein the subset of the plurality of resource reservation periods for partial sensing indicates 16 periodicity values of the plurality of resource reservation periods.

7. The method of claim 1, wherein the configuration information further indicates at least one additional periodicity value for partial sensing.

8. The method of claim 1, wherein the sidelink signal comprises at least one of:
a physical sidelink control channel (PSCCH) comprising first sidelink control information (SCI); or
a physical sidelink shared channel (PSSCH) comprising second SCI.

9. The method of claim 1, further comprising:
determining, from periodicity values of the subset of the plurality of resource reservation periods for partial sensing, a periodicity value; and
transmitting, to the second wireless user device, sidelink control information (SCI) comprising the determined periodicity value.

10. The method of claim 1, further comprising:
based on the second partial sensing, skipping monitoring a second subset of slots in the second sensing window, wherein the plurality of slots in the second sensing window comprises the second subset of slots that is not monitored by the first wireless user device.

11. The method of claim 1, further comprising:
performing, within a third sensing window, a full sensing associated with sidelink transmission,
wherein the first sensing window is shorter than the third sensing window,
wherein the first partial sensing is a continuous partial sensing in each slot of the first sensing window, and
wherein the second partial sensing is a periodic-based partial sensing.

12. The method of claim 1, further comprising:
determining, based on the slot in the selection window, the first sensing window and the second sensing window, wherein the slot in the selection window comprises a single slot resource candidate.

13. A method comprising:
receiving, by a first wireless user device, configuration information indicating:
a resource pool for sidelink communication;
a plurality of resource reservation periods; and
a subset of the plurality of resource reservation periods for partial sensing;
performing, based on a first slot in a selection window, a first partial sensing in each slot of a first sensing window;
performing a second partial sensing in a first subset of slots of a plurality of slots in a second sensing window, wherein each slot of the first subset of slots is offset from a second slot in the selection window based on at least one periodicity value of the subset of the plurality of resource reservation periods for partial sensing; and
transmitting, based on at least one of the first partial sensing or the second partial sensing, a sidelink signal to a second wireless user device via at least one resource of the first slot in the selection window or at least one resource of the second slot in the selection window.

14. The method of claim 13, wherein the subset of the plurality of resource reservation periods for partial sensing is determined by excluding at least one periodicity value from the plurality of resource reservation periods,
wherein the plurality of resource reservation periods comprises 0 ms, 1 ms, 2 ms, . . . , 99 ms, 100 ms, 200 ms, 300 ms, 400 ms, 500 ms, 600 ms, 700 ms, 800 ms, and 900 ms, and
wherein the plurality of resource reservation periods corresponds to sl-ResourceReservePeriodList.

15. The method of claim 13, wherein:
the second slot in the selection window comprises at least one y slot,
the first subset of slots corresponds to $(y-k \times P_a)$ slots,
y is the at least one y slot,
k is an integer,
$P_a$ is the at least one periodicity value of the subset of the plurality of resource reservation periods for partial sensing, and
$k \times P_a$ is an offset between the y slot and a slot of the first subset of slots.

16. The method of claim 13, wherein the subset of the plurality of resource reservation periods for partial sensing indicates 16 periodicity values of the plurality of resource reservation periods,
wherein the configuration information further indicates at least one additional periodicity value for partial sensing, and
wherein the sidelink signal comprises at least one of:
a physical sidelink control channel (PSCCH) comprising first sidelink control information (SCI); or
a physical sidelink shared channel (PSSCH) comprising second SCI.

17. The method of claim 13, further comprising:
determining, from periodicity values of the subset of the plurality of resource reservation periods for partial sensing, a periodicity value; and
transmitting, to the second wireless user device, sidelink control information (SCI) comprising the determined periodicity value.

18. The method of claim 13, further comprising:
based on the second partial sensing, skipping monitoring a second subset of slots in the second sensing window, wherein the plurality of slots in the second sensing window comprises the second subset of slots that is not monitored by the first wireless user device.

19. The method of claim 13, further comprising:
performing, within a third sensing window, a full sensing associated with sidelink transmission,
wherein the first sensing window is shorter than the third sensing window,
wherein the first partial sensing is a continuous partial sensing in each slot of the first sensing window, and
wherein the second partial sensing is a periodic-based partial sensing.

20. The method of claim 13, further comprising:
determining, based on the first slot in the selection window, the first sensing window;
determining, based on the second slot in the selection window, the second sensing window,
wherein the first slot in the selection window comprises a first single slot resource candidate, and
wherein the second slot in the selection window comprises a second single slot resource candidate.

* * * * *